(12) United States Patent
Shaffer et al.

(10) Patent No.: US 8,630,291 B2
(45) Date of Patent: Jan. 14, 2014

(54) DYNAMIC MULTI-PATH FORWARDING FOR SHARED-MEDIA COMMUNICATION NETWORKS

(75) Inventors: Shmuel Shaffer, Palo Alto, CA (US); Jonathan W. Hui, Foster City, CA (US); Jean-Philippe Vasseur, Saint Martin d'Uriage (FR)

(73) Assignee: Cisco Technology, Inc., San Jose, CA (US)

( * ) Notice: Subject to any disclaimer, the term of this patent is extended or adjusted under 35 U.S.C. 154(b) by 177 days.

(21) Appl. No.: 13/214,844

(22) Filed: Aug. 22, 2011

(65) Prior Publication Data

US 2013/0051250 A1  Feb. 28, 2013

(51) Int. Cl.
*H04L 12/28* (2006.01)

(52) U.S. Cl.
USPC ............................................... 370/390

(58) Field of Classification Search
USPC ......... 370/312, 328–339, 349, 351, 389–390, 370/392, 395.5–395.52, 400–401
See application file for complete search history.

(56) References Cited

U.S. PATENT DOCUMENTS

| 6,729,929 | B1 | 5/2004 | Sayers et al. |
| 6,894,985 | B2 * | 5/2005 | Billhartz ........................ 370/252 |
| 6,933,909 | B2 | 8/2005 | Theobold |
| 7,801,125 | B2 | 9/2010 | Kreeger et al. |
| 7,864,818 | B2 | 1/2011 | Fong et al. |
| 7,885,342 | B2 | 2/2011 | Brainos et al. |
| 7,933,197 | B2 | 4/2011 | Bryant et al. |
| 7,937,052 | B2 | 5/2011 | Banh et al. |
| 7,940,776 | B2 | 5/2011 | Retana et al. |
| 7,944,860 | B2 | 5/2011 | Rajagopalan et al. |
| 7,965,642 | B2 | 6/2011 | Shand et al. |
| 7,969,974 | B2 | 6/2011 | Arango et al. |
| 7,990,888 | B2 | 8/2011 | Nadeau et al. |
| 2008/0159151 | A1 * | 7/2008 | Datz et al. .................... 370/238 |
| 2009/0175193 | A1 * | 7/2009 | Shaffer et al. ................ 370/254 |

FOREIGN PATENT DOCUMENTS

| EP | 0851632 A2 | 7/1998 |
| EP | 1942614 A1 | 7/2008 |

OTHER PUBLICATIONS

"RPL: IPv6 Routing Protocol for Low Power and Lossy Networks" <draft-ietf-roll-rpl-19> by Winter, at al. (Mar. 13, 2011 version).

(Continued)

*Primary Examiner* — Frank Duong
(74) *Attorney, Agent, or Firm* — Edwards Wildman Palmer LLP; James M. Behmke; Stephen D. LeBarron

(57) ABSTRACT

In one embodiment, a quality of one or more links of a particular node in a communication network may be determined, and then whether the quality of the one or more links is below a threshold may also be determined. In response to determining that the quality of at least one of the one or more links is above the threshold, a select one of the at least one of the one or more links with quality above the threshold may be utilized for communication with the particular node. Conversely, in response to determining that the quality of each of the one or more links is below the threshold, multi-path forwarding over a plurality of links of the particular node may be utilized for communication with the particular node.

18 Claims, 17 Drawing Sheets

(56) References Cited

OTHER PUBLICATIONS

Lampreia, et al., "Notification of Transmittal of the International Search Report and the Written Opinion of the International Searching Authority, or the Declaration", Patent Cooperation Treaty, Dec. 4, 2012, 11 pages, PCT/US2012/051706, European Patent Office, Rijswijk, Netherlands.

* cited by examiner

US 8,630,291 B2

DYNAMIC MULTI-PATH FORWARDING FOR SHARED-MEDIA COMMUNICATION NETWORKS

TECHNICAL FIELD

The present disclosure relates generally to communication networks, and, more particularly, to multi-path forwarding in shared-media communication networks.

BACKGROUND

Low power and Lossy Networks (LLNs), e.g., sensor networks, have a myriad of applications, such as Smart Grid and Smart Cities. Various challenges are presented with LLNs, such as lossy links, low bandwidth, battery operation, low memory and/or processing capability, etc. One example routing solution to LLN challenges is a protocol called Routing Protocol for LLNs or "RPL," which is a distance vector routing protocol that builds a Destination Oriented Directed Acyclic Graph (DODAG, or simply DAG) in addition to a set of features to bound the control traffic, support local (and slow) repair, etc. The RPL architecture provides a flexible method by which each node performs DODAG discovery, construction, and maintenance.

One of the main challenges in LLNs is not only the limited bandwidth offered by links such as Low Power WiFi, IEEE 802.15.4, or PLC (IEEE P1901.2), but also the very high loss rates experienced on those links and the frequency at which such links may "flap" (be available or not, intermittently). Note that it is not uncommon to lose connectivity for seconds or even minutes, and to see a packet delivery ratio as low as 40% to 50%.

Most existing approaches detect transmission failures using explicit acknowledgments at the Media Access Control (MAC) layer or at higher layers (e.g., transport or application layers). Failure to receive an acknowledgment after attempting a transmission indicates that the intended receiver may not have received the packet. As a result, the transmitter will attempt to retransmit the packet at a later time. In LLNs, dynamic link qualities can easily lead to several retransmissions of a single packet before successfully receiving an acknowledgment. Such an approach can significantly increase communication delay, channel utilization, energy costs associated with transmissions, and other associated transmission costs.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1:
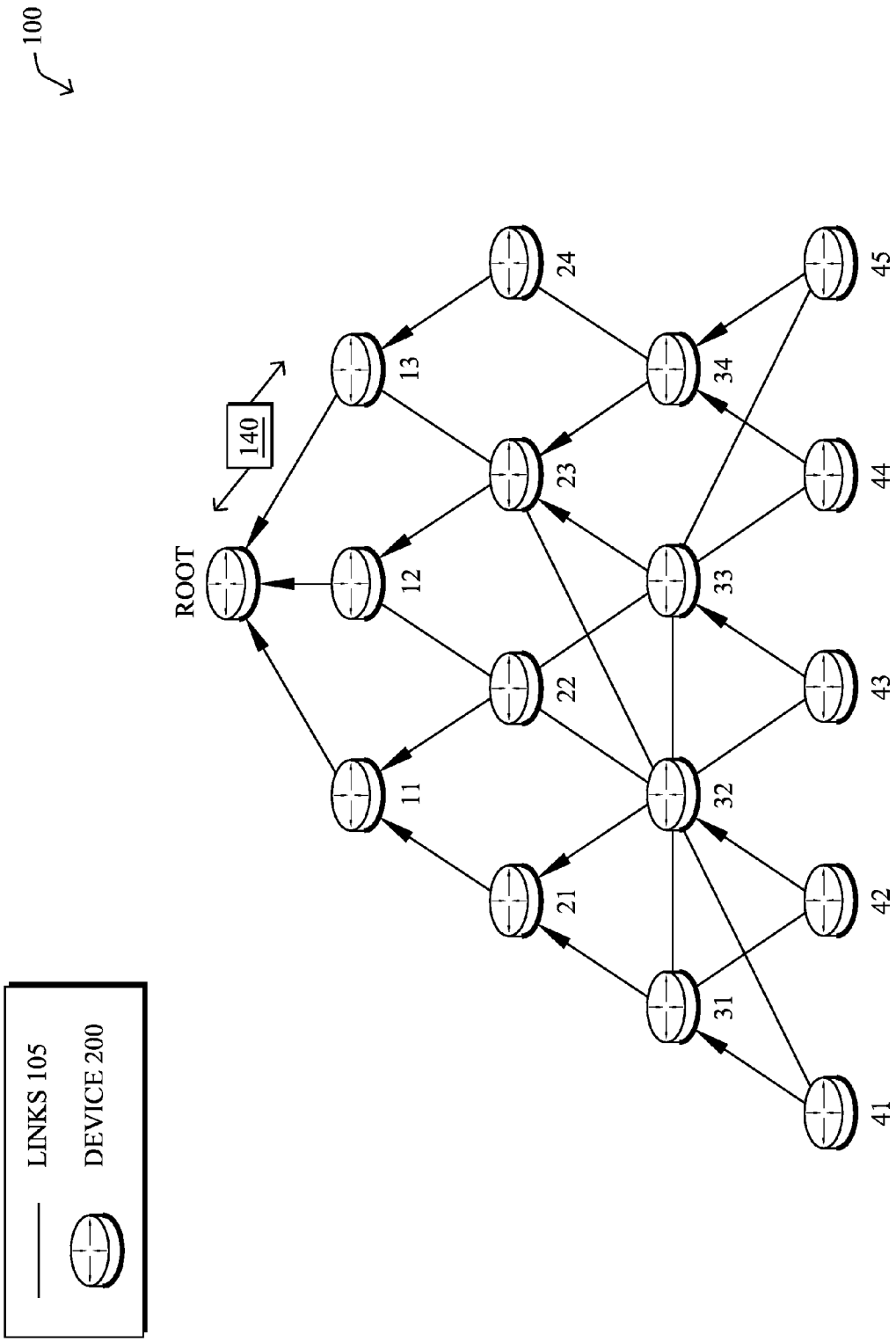
FIG. 1 illustrates an example communication network.

According to one or more embodiments of the disclosure, a quality of one or more links of a particular node in a communication network may be determined, and then whether the quality of the one or more links is below a threshold may also be determined. In response to determining that the quality of at least one of the one or more links is above the threshold, a select one of the at least one of the one or more links with quality above the threshold may be utilized for communication with the particular node. Conversely, in response to determining that the quality of each of the one or more links is below the threshold, multi-path forwarding over a plurality of links of the particular node may be utilized for communication with the particular node.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC) such as IEEE 61334, IEEE P1901.2, and others. In addition, a Mobile Ad-Hoc Network (MANET) is a kind of wireless ad-hoc network, which is generally considered a self-configuring network of mobile routes (and associated hosts) connected by wireless links, the union of which forms an arbitrary topology.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, is each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), etc. Generally, size and cost constraints on smart object nodes (e.g., sensors) result in corresponding constraints on resources such as energy, memory, computational speed and bandwidth. Correspondingly, a reactive routing protocol may, though need not, be used in place of a proactive routing protocol for smart object networks.

FIG. 1 is a schematic block diagram of an example computer network 100 illustratively comprising nodes/devices 200 (e.g., labeled as shown, "root," "11," "12," . . . "45," and described in FIG. 2 below) interconnected by various methods of communication. For instance, the links 105 may be shared media (e.g., wireless links, PLC links, etc.), where certain nodes 200, such as, e.g., routers, sensors, computers, etc., may be in communication with other nodes 200, e.g., based on distance, signal strength, current operational status, location, etc. Those skilled in the art will understand that any number of nodes, devices, links, etc. may be used in the computer network, and that the view shown herein is for simplicity.

Data packets 140 (e.g., traffic and/or messages sent between the devices/nodes) may be exchanged among the nodes/devices of the computer network 100 using predefined network communication protocols such as certain known wireless protocols (e.g., IEEE Std. 802.15.4, WiFi, Bluetooth®, etc.), PLC protocols, or other shared-media protocols where appropriate. In this context, a protocol consists of a set of rules defining how the nodes interact with each other.

Figure 2:
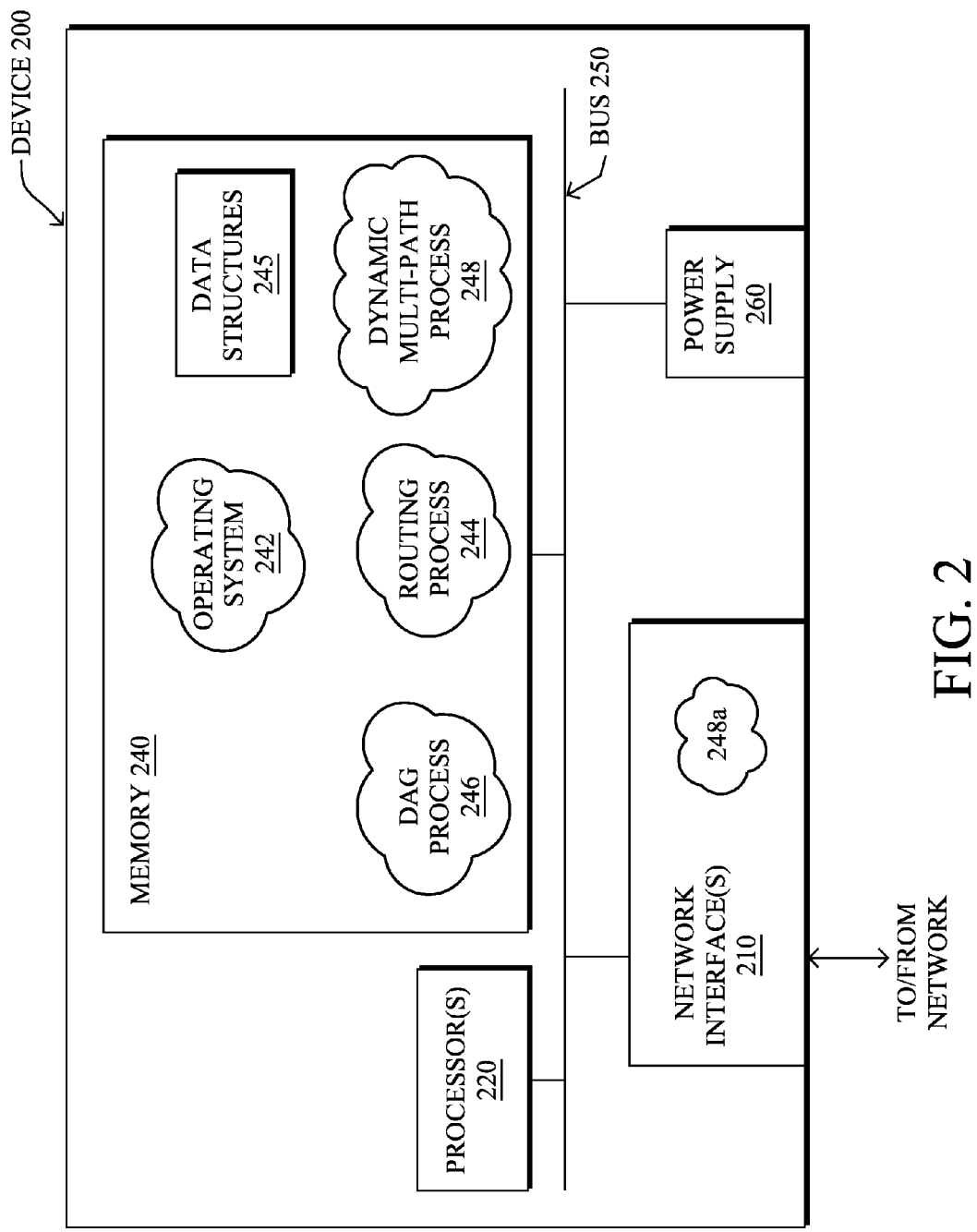
FIG. 2 illustrates an example network device/node.

FIG. 2 is a schematic block diagram of an example node/device 200 that may be used with one or more embodiments described herein, e.g., as any of the nodes shown in FIG. 1 above. The device may comprise one or more network interfaces 210 (e.g., wireless, PLC, etc.), at least one processor 220, and a memory 240 interconnected by a system bus 250, as well as a power supply 260 (e.g., battery, plug-in, etc.).

The network interface(s) 210 contain the mechanical, electrical, and signaling circuitry for communicating data over links 105 coupled to the network 100. The network interfaces may be configured to transmit and/or receive data using a variety of different communication protocols. Note, further, that the nodes may have two different types of network connections 210, e.g., wireless and wired/physical connections, and that the view herein is merely for illustration. Also, while the network interface 210 is shown separately from power supply 260, for PLC the network interface 210 may communicate through the power supply 260, or may be an integral component of the power supply. In some specific configurations the PLC signal may be coupled to the power line feeding into the power supply.

The memory 240 comprises a plurality of storage locations that are addressable by the processor 220 and the network interfaces 210 for storing software programs and data structures associated with the embodiments described herein. Note that certain devices may have limited memory or no memory (e.g., no memory for storage other than for programs/processes operating on the device and associated caches). The processor 220 may comprise necessary elements or logic adapted to execute the software programs and manipulate the data structures 245. An operating system 242, portions of which are typically resident in memory 240 and executed by the processor, functionally organizes the device by, inter alia, invoking operations in support of software processes and/or services executing on the device. These software processes and/or services may comprise routing process/services 244, a directed acyclic graph (DAG) process 246, and an illustrative dynamic multi-path process 248, as described herein. Note that while dynamic multi-path process 248 is shown in centralized memory 240, alternative embodiments provide for the process to be specifically operated within the network interfaces 210, such as a component of a MAC layer (process "248a").

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Routing process (services) 244 contains computer executable instructions executed by the processor 220 to perform functions provided by one or more routing protocols, such as proactive or reactive routing protocols as will be understood by those skilled in the art. These functions may, on capable devices, be configured to manage a routing/forwarding table (a data structure 245) containing, e.g., data used to make routing/forwarding decisions. In particular, in proactive routing, connectivity is discovered and known prior to computing routes to any destination in the network, e.g., link state routing such as Open Shortest Path First (OSPF), or Intermediate-System-to-Intermediate-System (ISIS), or Optimized Link State Routing (OLSR). Reactive routing, on the other hand, discovers neighbors (i.e., does not have an a priori knowledge of network topology), and in response to a needed route to a destination, sends a route request into the network to determine which neighboring node may be used to reach the desired destination. Example reactive routing protocols may comprise Ad-hoc On-demand Distance Vector (AODV), Dynamic Source Routing (DSR), DYnamic MANET On-demand Routing (DYMO), etc. Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices simply forward the packets as directed.

Notably, mesh networks have become increasingly popular and practical in recent years. In particular, shared-media mesh networks, such as wireless or PLC networks, etc., are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point such at the root node to a subset of devices inside the LLN) and multipoint-to-point traffic (from devices inside the LLN towards a central control point).

An example protocol specified in an Internet Engineering Task Force (IETF) Internet Draft, entitled "RPL: IPv6 Routing Protocol for Low Power and Lossy Networks"<draft-ietf-roll-rpl-19> by Winter, at al. (Mar. 13, 2011 version), provides a mechanism that supports multipoint-to-point (MP2P) traffic from devices inside the LLN towards a central control point (e.g., LLN Border Routers (LBRs) or "root nodes/devices" generally), as well as point-to-multipoint (P2MP) traffic from the central control point to the devices inside the LLN (and also point-to-point, or "P2P" traffic). RPL (pronounced "ripple") may generally be described as a distance vector routing protocol that builds a Directed Acyclic Graph (DAG) for use in routing traffic/packets 140, in addition to defining a set of features to bound the control traffic, support repair, etc. Notably, as may be appreciated by those skilled in the art, RPL also supports the concept of Multi-Topology-Routing (MTR), whereby multiple DAGs can be built to carry traffic according to individual requirements.

Also, a directed acyclic graph (DAG) is a directed graph having the property that all edges are oriented in such a way that no cycles (loops) are supposed to exist. All edges are contained in paths oriented toward and terminating at one or more root nodes (e.g., "clusterheads or "sinks"), often to interconnect the devices of the DAG with a larger infrastructure, such as the Internet, a wide area network, or other domain. In addition, a Destination Oriented DAG (DODAG) is a DAG rooted at a single destination, i.e., at a single DAG root with no outgoing edges. A "parent" of a particular node within a DAG is an immediate successor of the particular node on a path towards the DAG root, such that the parent has a lower "rank" than the particular node itself, where the rank of a node identifies the node's position with respect to a DAG root (e.g., the farther away a node is from a root, the higher is the rank of that node). Note also that a tree is a kind of DAG, where each device/node in the DAG generally has one parent or one preferred parent. DAGs may generally be built (e.g., by DAG process 246 and/or routing process 244) based on an Objective Function (OF). The role of the Objective Function is generally to specify rules on how to build the DAG (e.g. number of parents, backup parents, etc.).

As noted above, one of the main challenges in LLNs is not only the limited bandwidth offered by links such as Low Power WiFi, IEEE 802.15.4, or PLC (IEEE P1901.2), but also the very high loss rates experienced on those links and the frequency at which such links may "flap" (be available or not, intermittently). Note that it is not uncommon to lose connectivity for seconds or even minutes, and to see a packet delivery ratio as low as 40% to 50%.

As also noted above, most existing approaches detect transmission failures using explicit acknowledgments at the Media Access Control (MAC) layer or at higher layers (e.g., transport or application layers). Failure to receive an acknowledgment after attempting a transmission indicates that the intended receiver may not have received the packet. As a result, the transmitter will attempt to retransmit the packet at a later time. In LLNs, dynamic link qualities can easily lead to several retransmissions of a single packet before successfully receiving an acknowledgment. Such an approach can significantly increase communication delay, channel utilization, energy costs associated with transmissions, and other associated transmission costs.

The benefits of multi-path forwarding are well known and there has been much existing work in the area. Existing work in multi-path forwarding typically involves proactively building and maintaining multiple paths towards a destination using "1:1" or "1+1" techniques. For example, source-route based mechanisms may maintain multiple source routes towards the destination. Hop-by-hop mechanisms may maintain multiple next-hop routes towards a destination using equal-cost multi-path (ECMP) for example, or even asymmetrical load balancing when supported by the routing protocol.

Existing approaches, however, do not discuss when and where multi-path forwarding should be initiated, and in most cases traffic is systematically duplicated end-to-end, which is a very costly approach in LLNs. Multi-path forwarding in this manner can incur significant cost since it involves forwarding more than one copy of a packet along a path that may or may not intersect along the way. Without selective techniques is as described herein, forwarding multiple copies of a packet can significantly reduce throughput, increase latency, and consume additional channel capacity, particularly due to the strict resource constraints of LLN devices.

Dynamic Multi-Path Forwarding

The techniques herein may be used to determine when and where to utilize multi-path forwarding, i.e., dynamically determining when it may be appropriate to utilize multiple paths and what nodes along a path towards the destination should forward a message along multiple paths. In particular, in order to reduce communication delay and potentially transmission costs, the techniques herein also take advantage of the fact that LLN links are often non-broadcast multiple access (NBMA) links, where at the physical layer, multiple receivers may receive a single transmission on their respective NBMA (shared media) links simultaneously. For example, when a node detects that its uplink links towards its parent are of poor quality, the node may invoke a special hybrid routing protocol (single-hop multicasting) which marks the packets to be sent as multicast messages over the first hop, which from there is forwarded by the next hop according to its routing table as a unicast message. The same is true in the reverse when forwarding toward the particular node with poor quality links, though to ensure that the plurality of poor quality links of the particular node are utilized, diverse paths are used from nodes that are multiple hops away from the poor quality links (branch points).

Generally, according to one or more embodiments of the disclosure as described in detail below, a quality of one or more links of a particular node in a communication network may be determined, and then whether the quality of the one or more links is below a threshold may also be determined. In response to determining that the quality of at least one of the one or more links is above the threshold, a selected one of the at least one of the one or more links with quality above the threshold may be utilized for communication with the particular node. Conversely, in response to determining that the quality of each of the one or more links is below the threshold, multi-path forwarding over a plurality of links of the particular node may be utilized for communication with the particular node.

Illustratively, the techniques described herein may be performed by hardware, software, and/or firmware, such as in accordance with the dynamic multi-path process 248/248a, which may contain computer executable instructions executed by the processor 220 (or independent processor of interfaces 210) to perform functions relating to the novel techniques described herein, e.g., in conjunction with routing process 244 (and/or DAG process 246). For example, the techniques herein may be treated as extensions to conventional routing and/or forwarding protocols, such as the various shared-media protocols or the RPL protocol, and as such, may be processed by similar components understood in the art that execute those protocols, accordingly.

According to one or more particular embodiments herein, the communication with the particular node is from the particular node to a particular destination. For instance, in a large mesh network (such as AMI), link quality and node density may vary greatly. Assume, for example, a wireless sensor mesh network arranged as a DAG cell. Assume further that at the center of the cell (closer to the root node) node density is high, link quality is good (low bit error rate), and because all of the packets from the cell traverse the network toward the root, channel utilization is high. On the other hand at the edge of the cell there are multiple leaf nodes that have only a few prospective next-hops (called parents with RPL, though note that the techniques herein are not tied to a particular routing protocol).

More than likely (as observed in existing networks), some of these leaf nodes may have links toward their prospective parents that are of poor quality and therefore the communication from these leaf nodes toward the root node is prone to link errors resulting in multiple retries. For the sake of illustration, using the RPL routing protocol, if a node attempts to send a message uplink via its parent and the transmission is not acknowledged, the leaf node may increase the cost of this link in its internal tables and switch to an alternate parent at some point of time in the future. Assuming that the link to the next prospective parent is also of poor quality, the process may repeat itself a few times until the message is finally successfully transmitted to the parent of the leaf node and forwarded from there towards the root node. (It should be noted that this scenario is provided only for the purpose of illustration, and the techniques herein are applicable broadly to other scenarios as well.)

As noted above, the process of sending a packet uplink from a node that has links of rather poor quality experience significant delays, consume additional channel capacity, and incur extra transmission costs (as it may require multiple retries and at times necessitate switching to another parent that may also be connected via a poor quality link).

Operationally, the techniques herein introduce a new message type that is a hybrid between a unicast and multicast message for multi-path forwarding, called a "single-hop multicast" message. Like a unicast message, a packet in accordance with the techniques herein has a unicast address field indicating the target recipient of the message. Often, for example, this address is the address of the root node or the address of the application endpoint such as a head-end, server in a data center, etc. In addition, a packet in accordance with our invention has a special field indicating that it will traverse the first hop as a multicast message. For instance, if a node were to simply send all of its packets via multicast (in this particular case of several next-hops connected with poor quality links), the packets have a higher probability of reaching at least one parent, but then duplicate receptions from the multicast packets may increase the traffic via the network, resulting in greater congestion at the center of the mesh (closer to the root node). This in turn could increase packet collision that would slow down the performance of the network for all other nodes.

Figure 3:
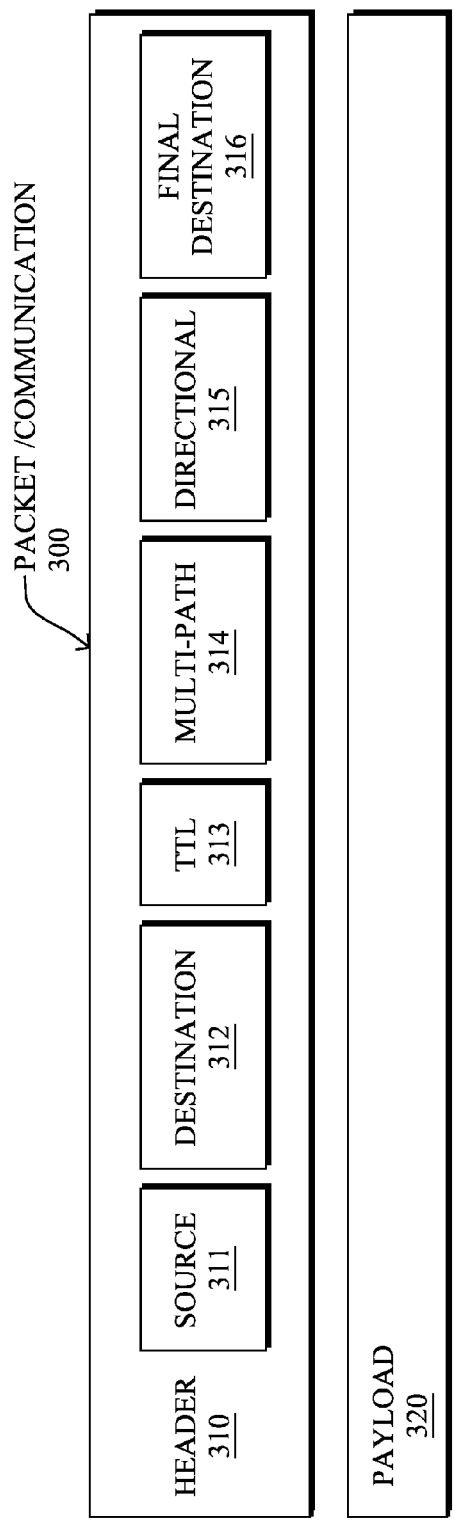
FIG. 3 illustrates an example packet format.

FIG. 3 illustrates an example packet/message format that may be used in accordance with multi-hop communication, particularly for single-hop multicasting. The packet 300 may generally comprise a header 310 used for forwarding the packet, and a payload 320 used to carry the contents of the packet/message. Specifically, as described in detail below, the header 310 may conventionally comprise a source address 311 and a destination address 312, as well as a time-to-live (TTL) field 313. In addition, according to certain particular embodiments herein, the packet header 310 may also comprise an illustrative multi-path bit 314, a directional bit 315, and a final destination field 316.

Returning to the scenario described above, when a node identifies that all of its uplink links ("uplinks") have low quality, the node may utilize multi-path forwarding over a plurality of its links by single-hop multicasting the communication (packet 300) from the particular node over the plurality of uplinks to a plurality of respective receivers. For example, the node may mark the packet with the special multi-path field 314 indicating that the packet should traverse the next hop as a multicast message with a TTL 313 of one. The next-hops/parents who receive this special packet examine the final destination address field 316 and proceed to send the message as a unicast message towards the target, e.g., the root node or the headend.

The techniques herein take advantage of the fact that other nodes in the vicinity of a preferred next hop (e.g., parent) also receive the packet, even if they are not the preferred next hop. Referring again to FIG. 1, the routing topology computed by a routing protocol in an LLN (e.g., by RPL) may result in the arrows as shown to a select set of preferred next hops (e.g., parents) based on one or more deciding factors (signal strength, node capability, etc.). That is, in many routing protocols, a node identifies its preferred next hop(s) and potential backup(s). For example, in LLNs using RPL as their routing protocol of choice, each node maintains a list of preferred next-hop(s) called "parents." In some situations, there may be multiple preferred next-hops (e.g., when using ECMP—load balancing) and a set of back-up parents. As used herein, <P, BP1, . . . , BPn> is the list of preferred parent (P) and back-up parents BP1, . . . , BPn. In one embodiment of the techniques herein, each node determines a sub-list of candidate next-hops (parents) referred to as helping-nodes, where helping-nodes=<P, B1, . . . , Bk>. For instance, in one example, assume that node 32 would compute the following list <21, 22, 23> where 21 is the preferred parent, and nodes 22 and 23 are helping nodes).

In one embodiment, a link local packet may be sent that lists the IP addresses of the nodes in the helping-nodes list, as well as an associated IP multicast address of a corresponding multicast group. In other words, a plurality of respective receiver nodes ("receivers") may be explicitly configured as a multicast group (helping-nodes list) prior to single-hop multicasting any communication to the respective receivers. For example, node 32 may send a link-local packet asking nodes 21, 22 and 23 to join the multicast group "MG1" (Multicast Group 1). Note that the list may be ordered by order of priority, with the first node being the preferred next-hop/parent, and so on.

When a node sends a single-hop multicast data packet 300 (e.g., in response to certain triggers/conditions discussed below), the node performs the following set of operations:

1) The ultimate IP destination is added to a newly defined IPv6 extended header (final destination field 316);

2) The destination 312 of the packet is set to the multicast address (e.g., "MG1"); and 3) The packet TTL 313 is set to 1 (this is to avoid sending a link layer broadcast for multicast packets that would be flooded in the network).

Figure 4A:
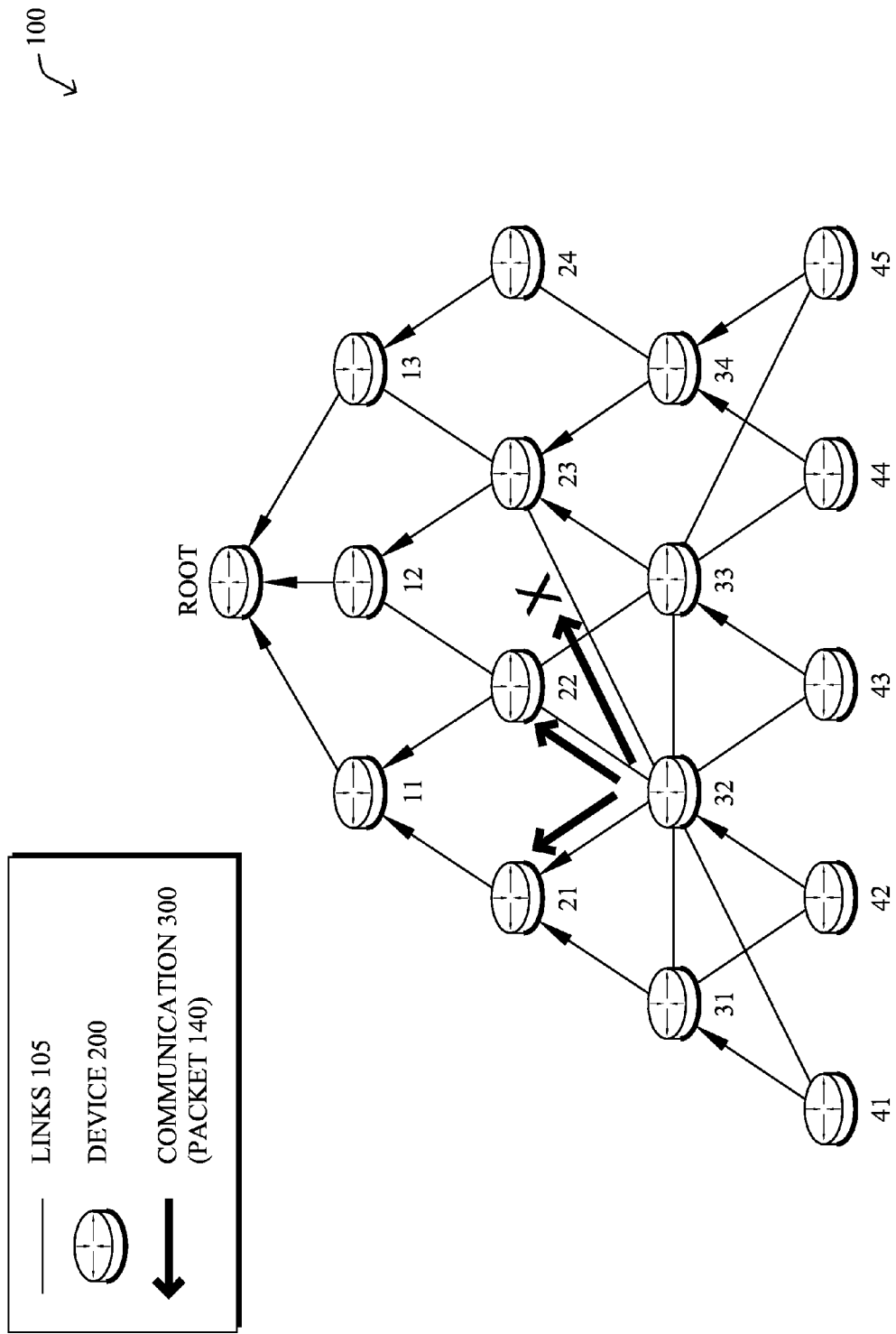
FIGS. 4A-C illustrate an example of multi-path forwarding from a particular node to a particular destination.
Figure 4B:
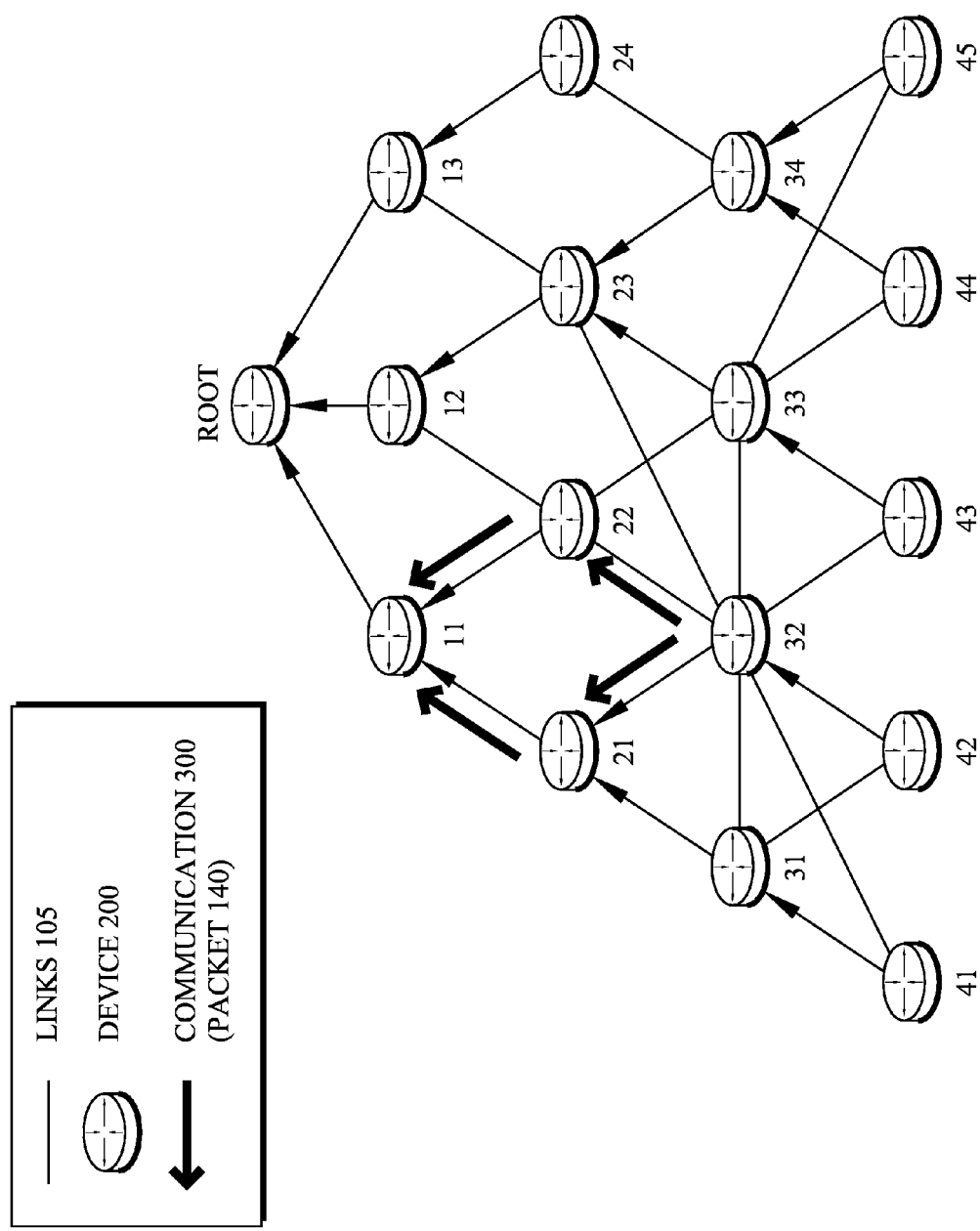
Figure 4C:
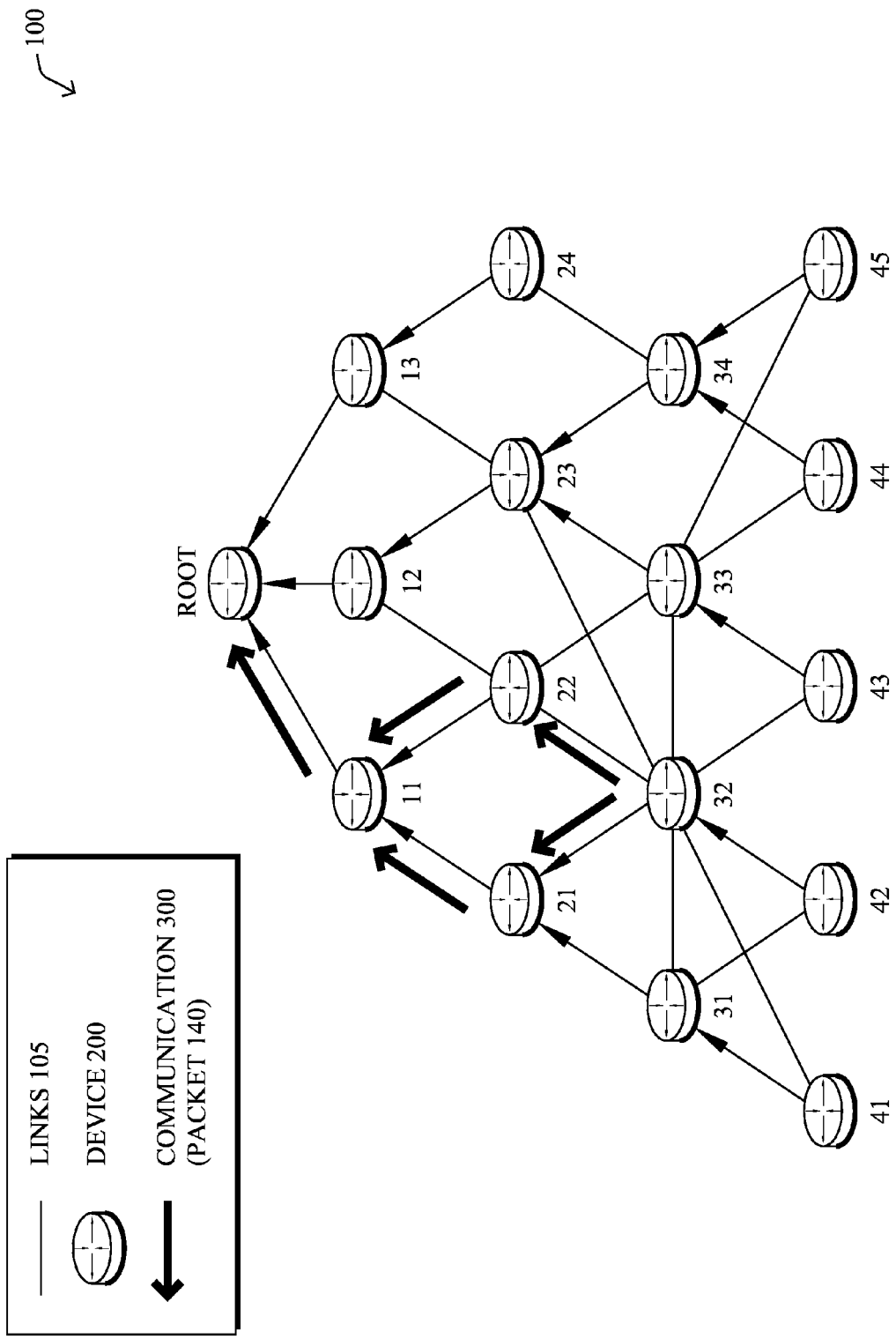

As a simplified example, FIGS. 4A-C illustrate multi-path forwarding according to one or more embodiments herein. For instance, assuming as shown in FIG. 4A that node 32 utilized single-hop multicasting to a set of reachable nodes 21, 22, and 23, it is generally likely with poor quality links that one or more of the links will not allow for successful reception by the respective receiver nodes (e.g., node 23). The nodes that do actually receive the communication, however, such as nodes 21 and 22 as shown in FIG. 4B, may proceed to forward the communication as a unicast packet toward the destination (e.g., the root node). Upon receipt at a merge-point (e.g., node 11), that merge-point may ignore duplicate transmissions (described below), and forwards a single copy of the communication to the destination as shown in FIG. 4C.

Note that in an enhanced embodiment, upon receiving this particular type of packet 300, if the receiver node is the preferred next-hop (e.g., node 21), the packet is acknowledged and forwarded along the routing topology. If the node is not the preferred parent, however, it (e.g., node 22) may start a timer that is, in one embodiment, proportional to the order of the node in the helping-node list (i.e., a "multicast group order"). In one particular embodiment, the link layer is enhanced so as to provide to neighbors the value of the retransmission link layer timer (period of time after which a frame is retransmitted if not acknowledged by a neighbor), such as during establishment of the multicast group as described above. Upon the expiration of the timer (e.g., proportionally adjusted), if no node with a shorter timer (e.g., lower in the multicast group order) has acknowledged the packet, the node sends an ACK back and forwards (unicasts) the packet according to its routing topology (choosing its own preferred parent).

Figure 5A:
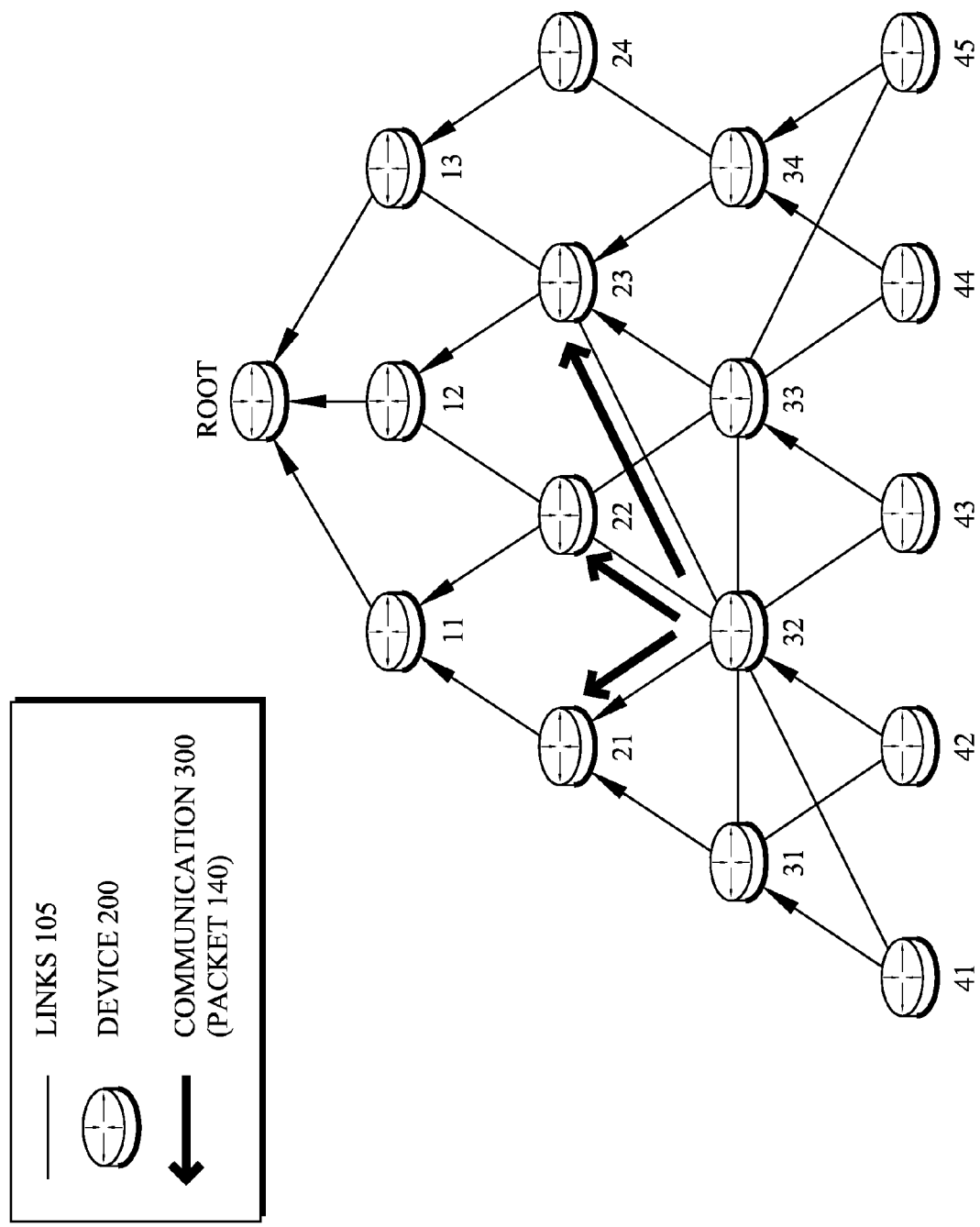
FIGS. 5A-C illustrate another example of multi-path forwarding from a particular node to a particular destination.
Figure 5B:
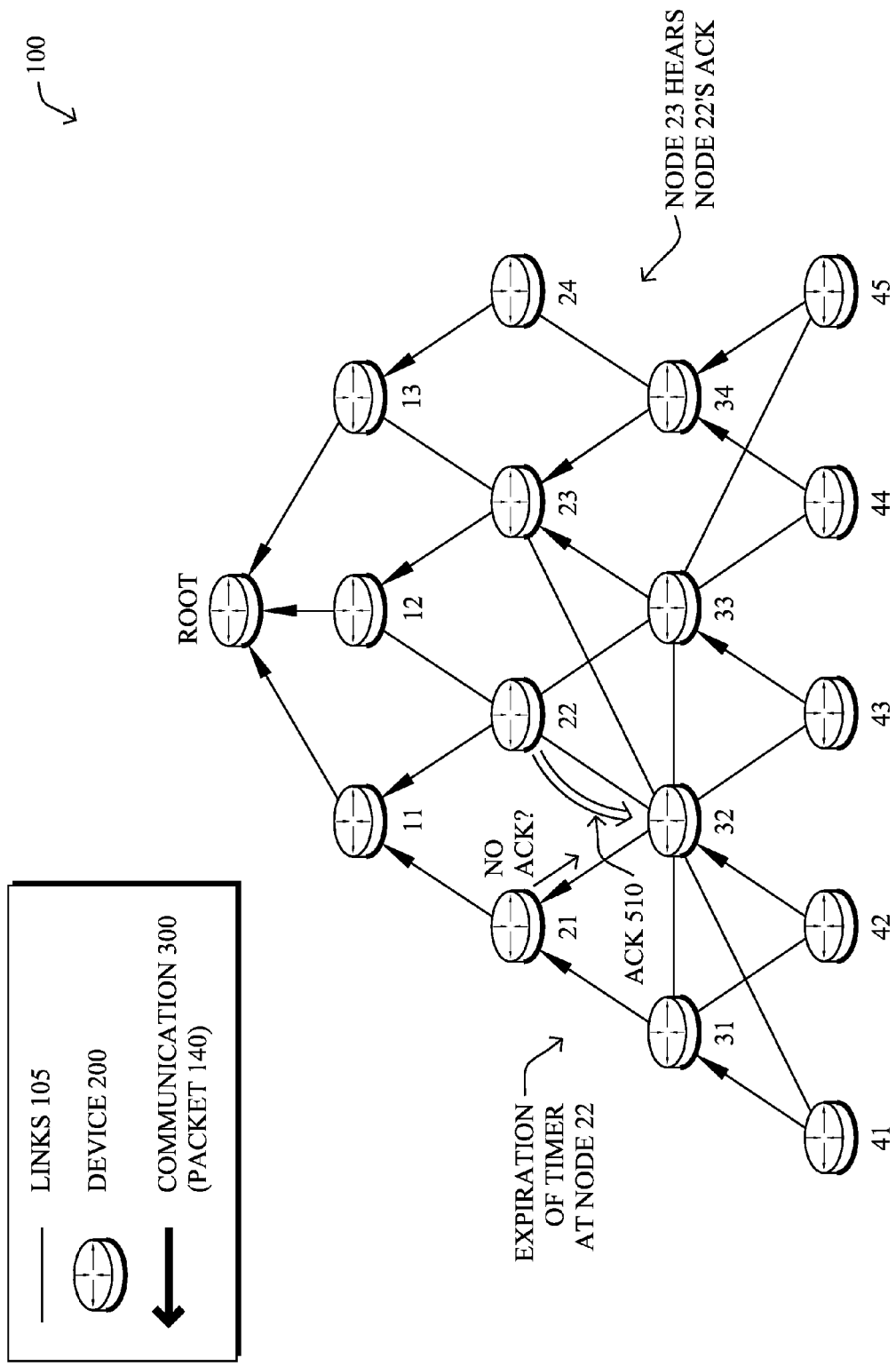
Figure 5C:
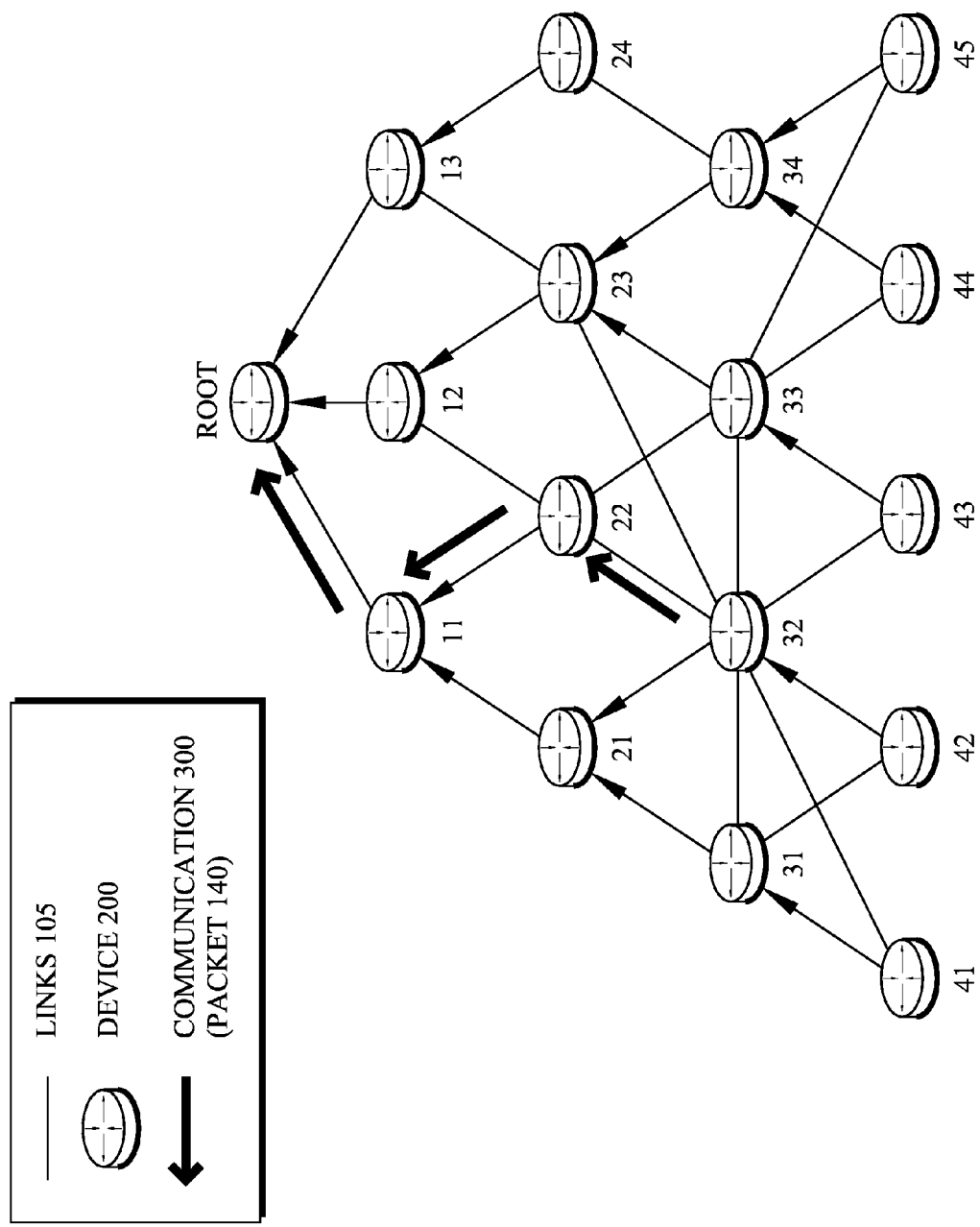

For example, with reference now to FIGS. 5A-5C, suppose again that node 32 sends a single-hop multicast packet 300 to nodes 21, 22 and 23 as shown in FIG. 5A, considering that 21 has been flagged as the preferred parent. Should the packet not be received by node 21 as shown in FIG. 5B, node 22's timer (e.g., randomized or else based on the multicast group order as mentioned above) would first expire without hearing node 21's acknowledgment (ACK). Since the node 21 will not have acknowledged the packet, the node 22 would send an ACK 510 back to node 32, and would trigger the same operation as described above, forwarding the packet to its preferred parent toward the destination, as shown in FIG. 5C. Note that there may be instances where node 21 ACKs the single-hop multicast packet, but node 22 does not hear the ACK. In this instance, the process would proceed as described above with reference to FIGS. 4A-4C where both node 21 and node 22 forward the packet. Note further that any node may independently determine whether to utilize multi-path forwarding, such that, for example, intermediate node 22 may itself decide to invoke helping-nodes (nodes 11 and 12) if the link quality to its own parents is below some threshold.

In another embodiment, the set of next hops (helping-nodes) may be chosen using implicitly created multicast groups, e.g., all nodes sufficiently receiving the single-hop multicast communication and/or a subset of all nodes sufficiently receiving the single-hop multicast communication based on one or more static or probabilistic filters. One filter, for example, may specify all nodes with an address/identification ending with a "1" bit as the next-hop destination. Another filter may specify a random distribution and threshold that the receivers should use to determine if they should be treated as a next-hop destination. In effect, the filters allow the receivers to determine whether or not they should continue to forward the packets to a next hop. The advantage of using an implicit multicast group is that it minimizes the cost of setting up an explicit multicast group. The downside, on the other hand, is the lack of explicit control by a node to control the set of next-hop nodes.

In accordance with one specific embodiment a node determines its potential parents and the quality of the links towards its parents. In a first specific embodiment, if the node determines that the quality of all of the links towards its parents (based on respective link metrics, e.g., cost, packet loss, ETX, etc.) are of poor quality (in comparison to some defined threshold), the node transitions to a state in which it sends its uplink communication(s) via the protocol described above wherein the first hop is sent via a special single-hop multicast which may transition to a unicast transmission over the next hops. In accordance with another embodiment the node may transition to the special transmitting protocol after it fails to successfully transmit a unicast packet uplink using one or more of its parents (i.e., determining that a set of previous unicast communication attempts over one or more of its local links have all failed). In this embodiment, the node may attempt each link, a sub-set of links, or a single preferred link prior to switching to the multi-path forwarding mode (e.g., depending upon a tolerance for delay).

Note that in accordance with another aspect of certain embodiments herein as mentioned above, the upstream nodes (nodes along the path between the sending node and the destination/root node, e.g., node 11) check the flag (multi-path bit 314) of each message 300 to determine whether a the message was sent over the first hop as a multicast message. In case a node determines that the packet was sent as a special multicast/unicast packet (single-hop multicast), that is, detecting an indication within the communication that it utilized multi-path forwarding, the node may be configured to prevent duplicates of the communication in response. For example, the receiving node may keep a hash function of the message or other identification (e.g., explicit packet IDs) in its memory 240 for a predetermined time. This functionality may thus serve to filter out packets in order to prevent sending uplink multiple replicas of the same packet towards the destination (e.g., the root or the headend), and to thus minimize mesh flooding (e.g., particularly near the center of a mesh cell).

Notably, in case the forwarding node (e.g., node 32 in the example above) detects that the quality of one or more of its uplinks improves, the node may automatically exit the special multi-path mode, and return to the mode of sending uplink messages using unicast transmissions.

In accordance with one or more additional or alternative embodiments herein, the "communication with the particular node" as mentioned above in the general description of the techniques herein may be packets sent from a particular source to the particular node (e.g., downlink from the root node to node 32). For instance, the techniques above allow devices to choose whether to forward a message using link-local multicast communication (single-hop multicast), thus utilizing the broadcast nature of shared-media links to increase the probability that at least one next-hop destination will receive the packet 300. This works well in the case of forwarding packets towards the root, the head-end application, or in general outside of the LLN (e.g., "uplink" traffic). However, a significant challenge that still remains is forwarding packets in the downward direction, such as from the root/headend or from outside of the LLN to an LLN device. In particular, link-local multicast is not enough to improve downward forwarding, since by the time the poor quality links are reached for the particular destination node (e.g., node 32), a forwarding node (e.g., node 21) may not have multiple paths to reach the destination in the same manner as described above. The techniques herein thus further determine where along the path it is desirable to initiate forwarding along multiple paths for communication traffic toward a destination with poor "last-hop" links (e.g., downlink traffic).

As noted above, a variety of routing protocols have been specified for IP: some of them make use of hop-by-hop forwarding (e.g., IS-IS or OSPF), others support source routing (e.g., MPLS Traffic Engineering) with or without routing state maintenance (e.g., MPLS TE maintains routing states but paths are computed by the head-end) and others support both modes. For example with RPL, LLN devices may operate in either storing or non-storing mode. With the former, both LLN devices and the root maintain downward routing state and uses hop-by-hop forwarding to deliver packets. With the latter, only the root maintains downward routing state and uses source-routing to deliver packets.

As explained in further detail below, these additional or alternative techniques utilize multi-path forwarding based on one or more triggers. For instance, in one embodiment the quality of the links may be determined to be below the threshold by relying on link metric values; some routing protocols even support per hop metric recording, thus allowing to pinpoint the location in the network where leaks are weak. Often, however, routing metrics in LLNs, for example, are updated at a very slow pace using low-pass filters, trying to capture transient failures. As such, there may be instances when using routing metrics would dramatically increase the routing control plane load, which may be unacceptable in certain constrained networks. Alternatively or in addition, therefore, multi-path forwarding may be utilized when it is determined that the traffic in the upstream direction was single-hop multicasted because links were unreliable (thus that the quality of links is below the threshold).

It is worth noting that although the multi-path bit 314 specified above may be utilized here, another generic use bit 314 bit may be included within the IPv6 extended header. A node detecting that a link suddenly becomes "weak" (e.g., low quality to make the opposing node unreachable or difficult to reach, a very frequent event in LLNs) could set this bit 314, which would serve as a trigger for multi-path forwarding in the opposite direction, still without having to change the routing metric, which would have a dramatic effect on the overall routing topology.

Note that in yet another embodiment, a second flag (directional bit 315) may be newly specified and used for the receiver of a multicasted packet to report that the link on which the packet was received was indeed of low quality in the upstream direction but not in the opposite direction, thus invalidating the need for multi-path forwarding in the downstream direction. In this instance, a forwarding node in the downward direction (e.g., the root node or other node, as appropriate) may determine that multi-path forwarding was utilized due to link low quality (weakness) only in a direction from the particular node to the particular destination (e.g., uplink). In response, the forwarding node may either not use multi-path forwarding in reverse (e.g., downlink), or may alternatively determine that the quality of the links is below the threshold only in response to respective link metrics in the opposite (e.g., downlink) direction.

According to one or more embodiments herein, in source routing mode, only certain devices (typically the root device) maintains downward routing state. As such, if the root node (or other forwarding node with appropriate route knowledge) determines that link quality is poor, for example, if multi-path forwarding was recently used in the upward direction and, if so, may use multi-path forwarding in the downward direction. That is, the forwarding node can use its routing information to reconstruct the routing topology and generate a plurality of source routes to deliver (forward) packets to their destination, i.e., that respectively traverse the plurality of local links of the particular node (notably, either the destination or an intermediate node).

Specifically, in an illustrative embodiment, when the root node receives packets from devices that are marked as having been forwarded using multi-path forwarding, the root node records that multi-path forwarding was used in the upward direction from the device identified by the source address. As such, when forwarding packets to devices using downward routing, the root node may determine whether multi-path forwarding was used recently for upwards packets from the destination. If multi-path forwarding was not used recently, the root node can determine that the upward path from the destination is robust and does not need to use multi-path forwarding in delivering packets to the destination. Conversely, if multi-path forwarding was used recently, or if link metrics are poor, the root node may determine that a single upward path is not robust enough and multi-path forwarding should be utilized. Note that a (dynamic) timer-based approach can be used to deal with transient low quality (weak) link states. In other words, the use of multi-path forwarding becomes a temporary fix for unstable routing topologies.

Figure 6A:
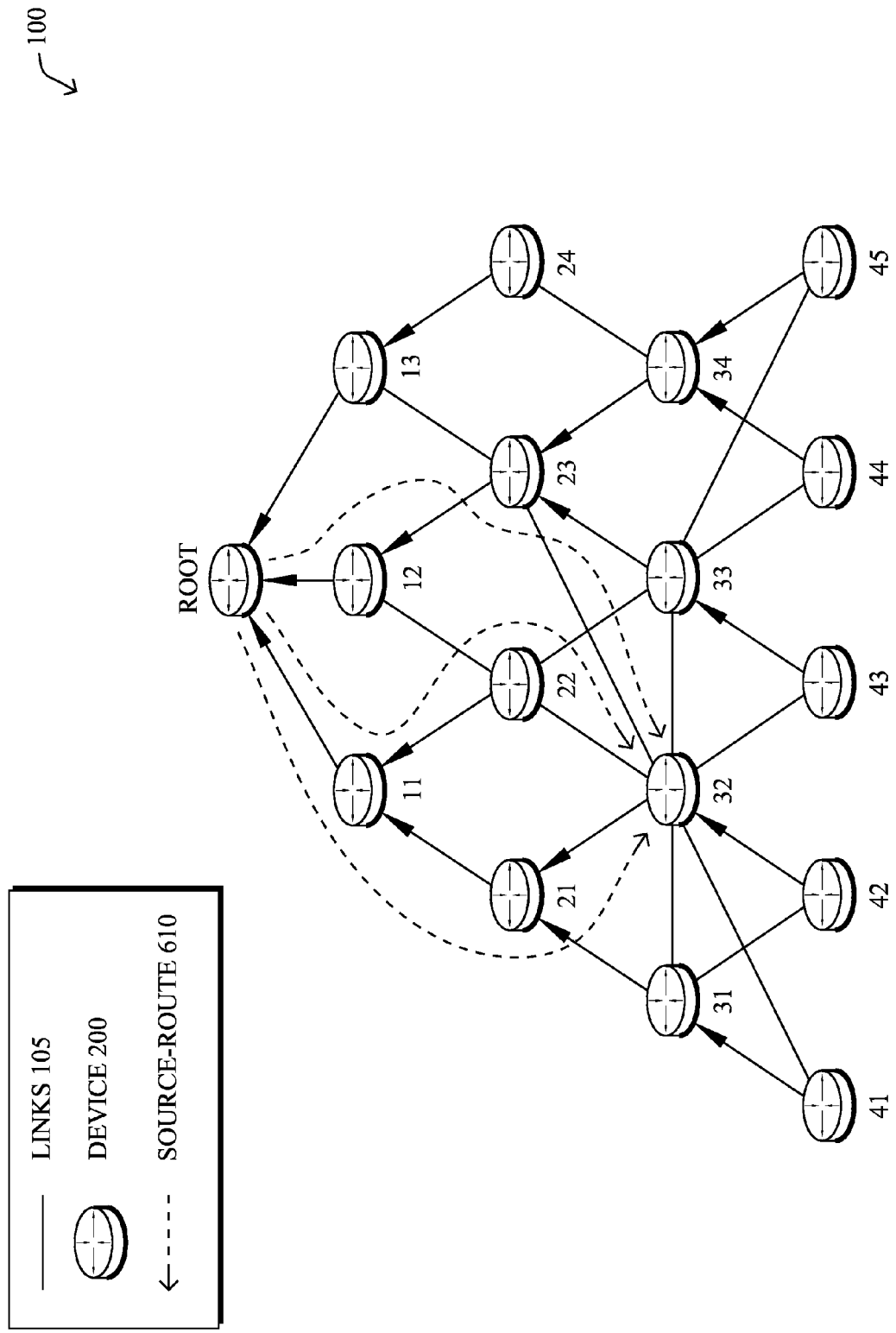
FIGS. 6A-B illustrate an example of multi-path forwarding from a particular source to a particular node.
Figure 6B:
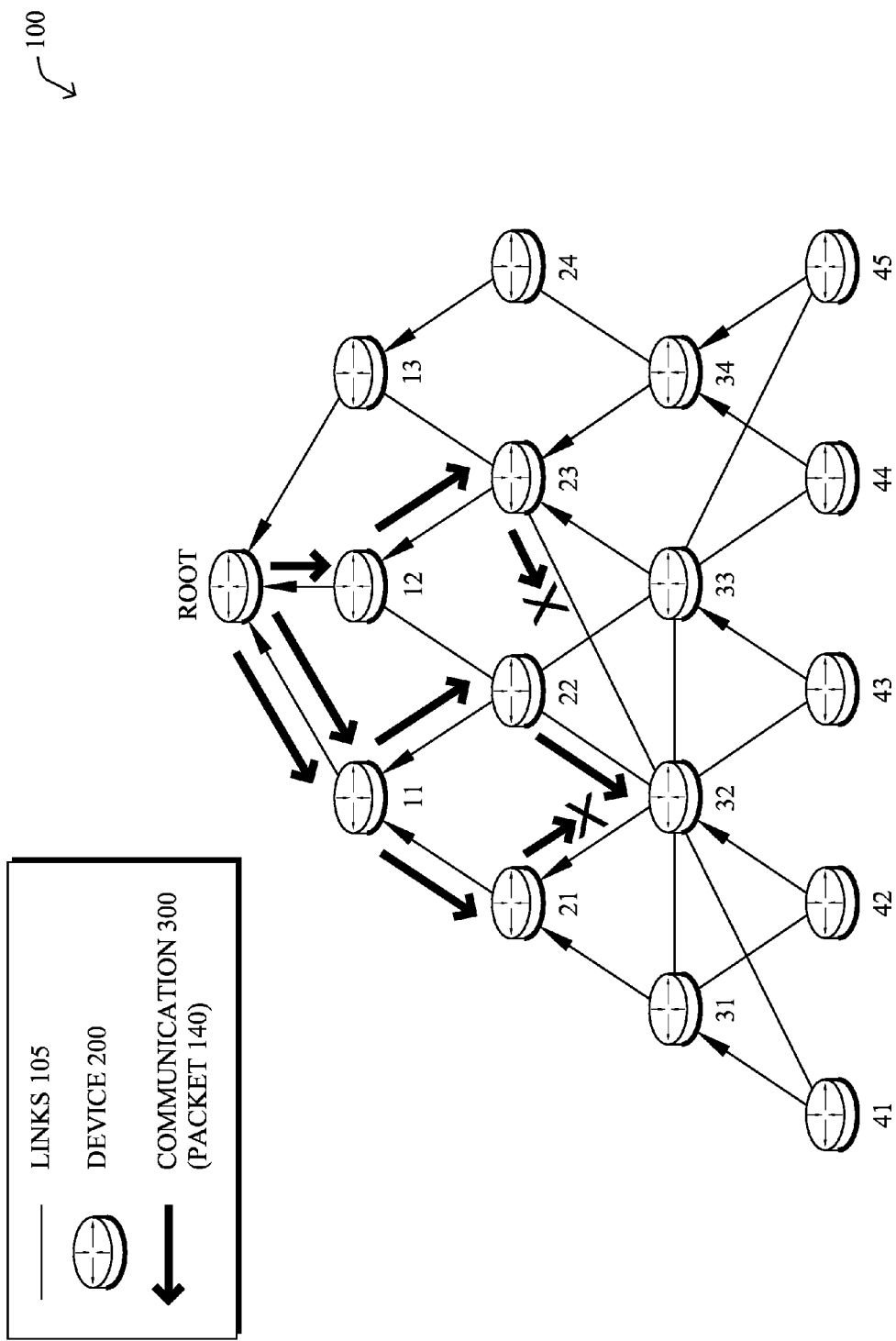

FIGS. 6A-6B illustrate an example of downward multi-path forwarding in this manner. For instance, as shown in FIG. 6A, the root node may generate a plurality of source routes 610 toward a particular destination, e.g., node 32, in an attempt to utilize a plurality of local links (with assumed poor quality) of node 32, e.g., from node 21, 22, and 23. As shown in FIG. 6B, copies of the communication (packets 140/300) may be sent along each source-routed path, in the hope that at least one of the poor local links (e.g., link 22-32) sufficiently transmits the communication.

According to one or more converse embodiments, in hop-by-hop routing mode, all devices maintain routing state (including downward). Using this downward routing state, the network can forward messages from the root to individual devices using hop-by-hop forwarding. According to the hop-by-hop routing mode embodiment(s), when intermediate devices receive upward packets that are marked as having been forwarded using multicast, the device records that multi-path forwarding was used in the upward direction from the device identified by the source address. When these devices then receive duplicates of such packets, the particular device can determine that it is acting as a merge-point for multiple uplink paths from the source and records an indication as such.

Accordingly, when forwarding downward packets, the device may determine if it was recently the merge-point for multiple paths of upward packets from the destination (or else may determine poor metrics in certain specific embodiments). If the device determines that it was not recently a merge point (or that the metrics are not poor), the forwarding device assumes that the downward path is robust and does not use multi-path forwarding. Conversely, if the device determines that it was recently a merge-point, the device assumes that a single downward path is not robust enough and utilizes multi-path forwarding to deliver the packet towards the destination. When using multi-path forwarding, the device forwards a copy of the packet to different next-hop devices towards the destination, e.g., branching the communication onto the links from which the duplicate upstream packets were originally received. Note that in the case, by contrast with other known techniques of multi-path forwarding, this is not necessarily the head-end (e.g., root node) that duplicates traffic, but may be any node along the path, thus reducing the overall duplicated traffic in the network.

Figure 7A:
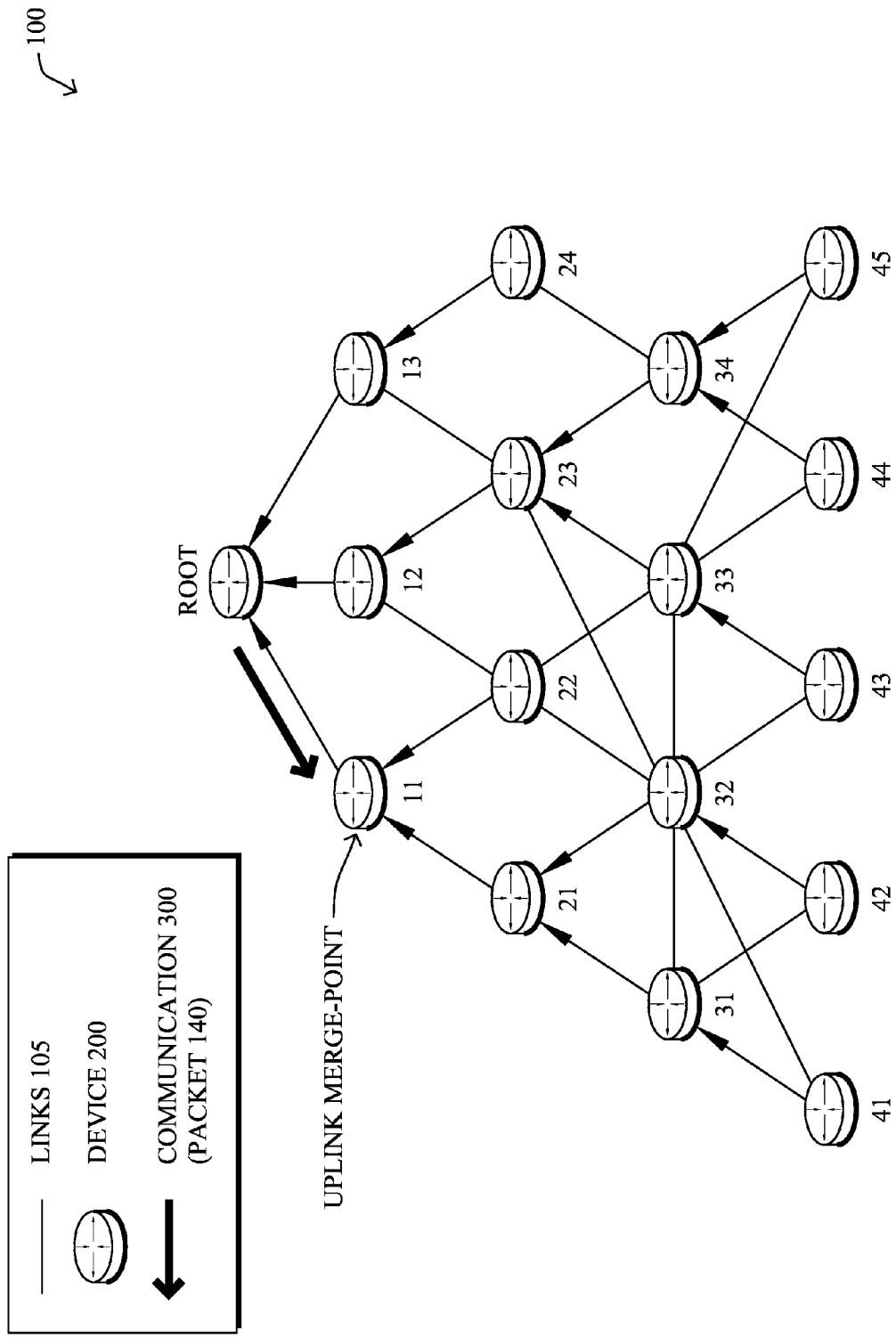
FIGS. 7A-B illustrate another example of multi-path forwarding from a particular source to a particular node.
Figure 7B:
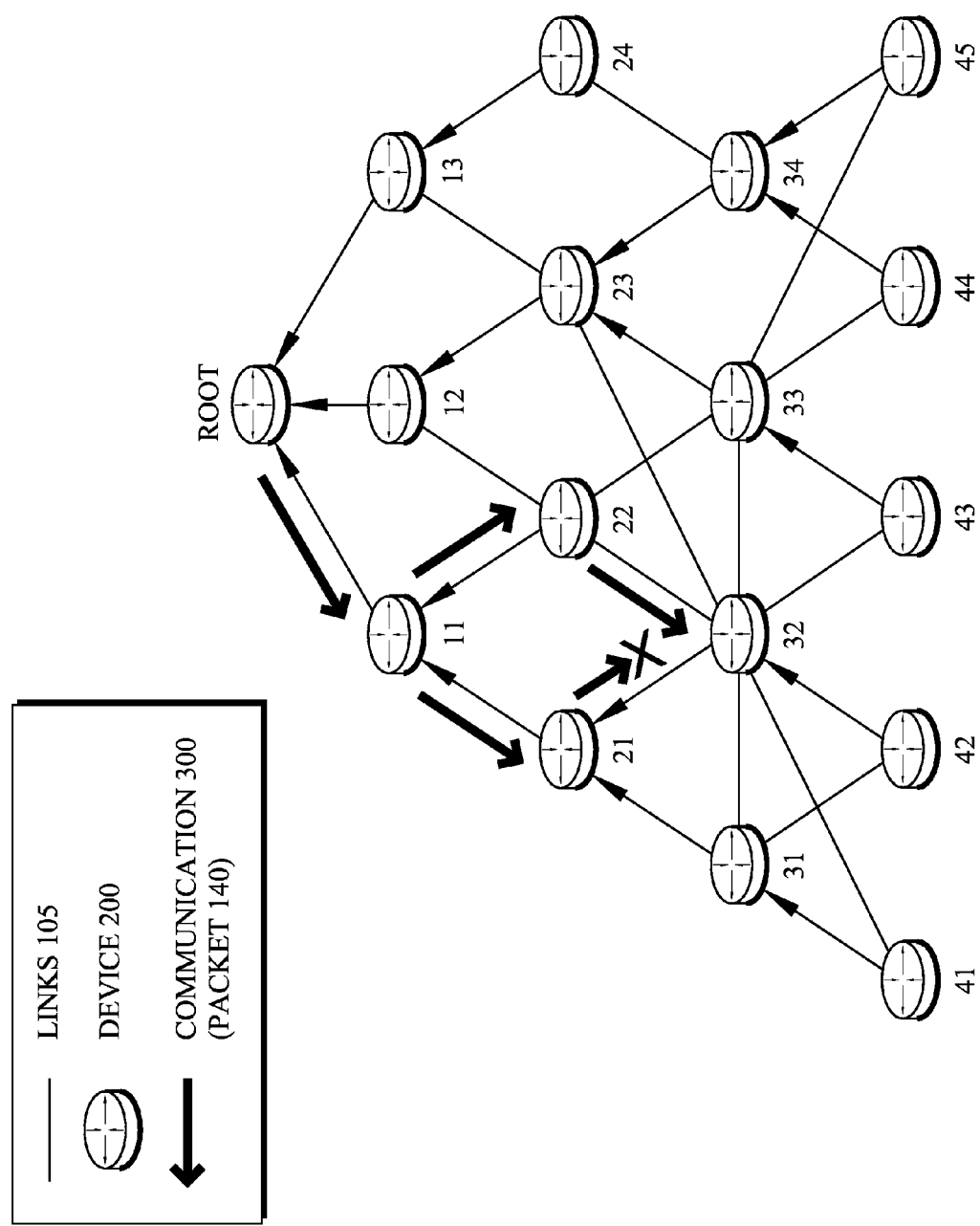

FIGS. 7A-7B illustrate an example of such a hop-by-hop multi-path forwarding technique. For instance, assume the example above in FIGS. 4A-4C, where node 32 forwarded a multi-path communication through nodes 21 and 22 toward the root node. Node 11 receives duplicate copies of the communication, and according to the embodiments now described, makes a note of the fact that it is a merge-point for node 32, illustratively via nodes 21 and 22. Upon receiving a communication in FIG. 7A from the root node destined for node 32, node 11 may recognize that is was a merge-point recently (e.g., based on some timer), and accordingly, may act as a "branch-point" for the corresponding downward communication by sending copies of the communication over multi-path forwarding to nodes 21 and 22, as shown in FIG. 7B.

Note that as shown in FIG. 7B, it is possible that even though node 11 received both transmissions from nodes 21 and 22 for the uplink traffic, that due to the low quality of the link, the occurrence of transient link failure (e.g., link 11-21) may still occur, hence the benefit of multi-path forwarding in the reverse direction. Note also that node 11 may only receive a single copy of an uplink multi-path communication from node 32, such as in FIG. 5C above. As such, node 11 may act as a downlink branch point for a given length of time in response to any duplicate uplink communications from node 32, despite only receiving a single copy of future uplink communications. In one embodiment, node 11 may resume operation as a unicasting forwarding node (a non-branching point) in the downlink direction upon receiving a single uplink communication that indicates that it is no longer a multi-path communication (e.g., a multi-path bit 314 set to zero).

Figure 8:
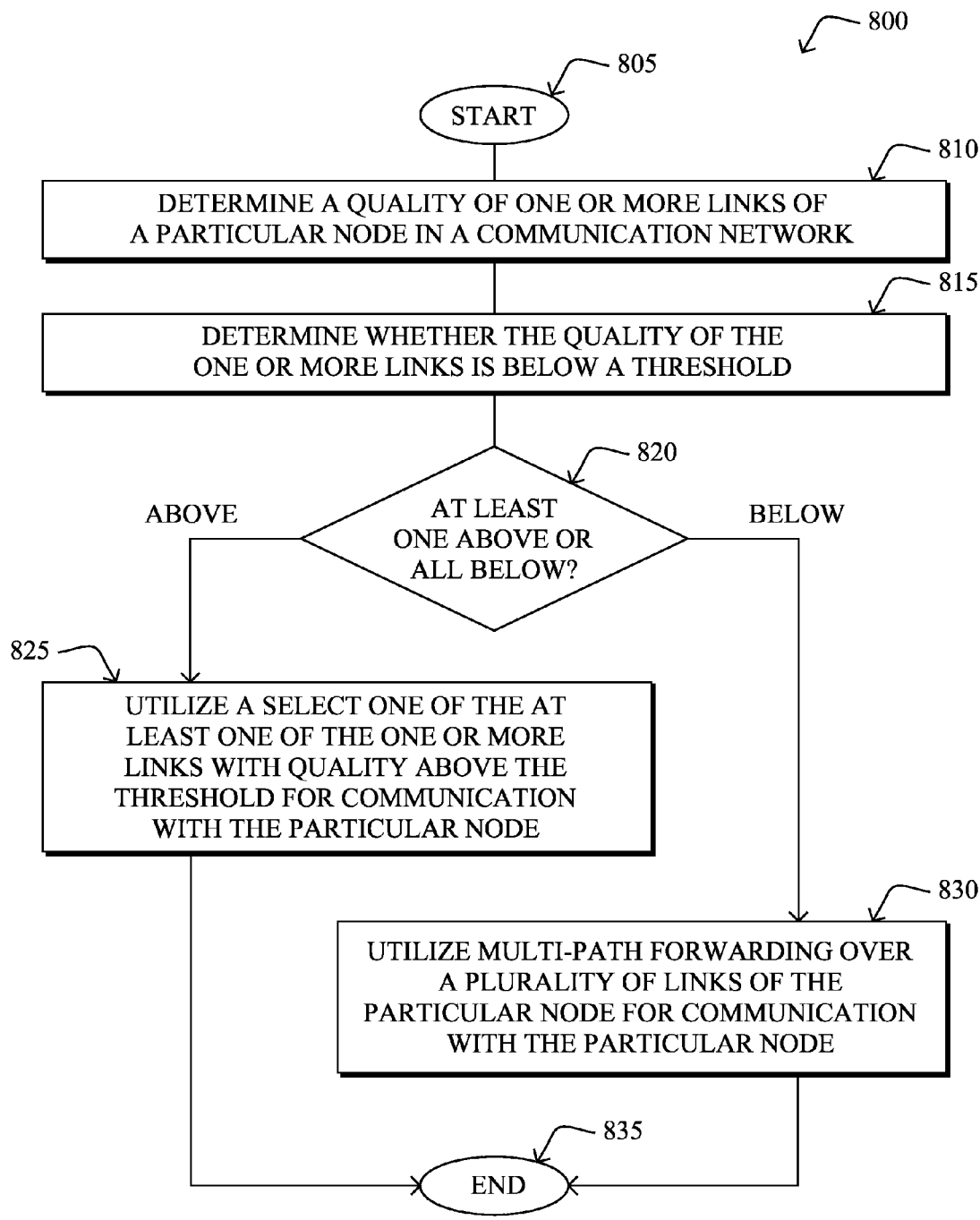
FIG. 8 illustrates an example simplified procedure for dynamic multi-path forwarding in a shared-media communication network.

FIG. 8 illustrates an example simplified procedure for dynamic multi-path forwarding in a shared-media communication network in accordance with one or more embodiments described herein. The procedure 800 starts at step 805, and continues to step 810, where, as described in greater detail above, the quality of one or more links of a particular node in a communication network may be determined. Once it is also determined in step 815 whether the quality of the one or more links is below a threshold, then either unicast forwarding or multi-path forwarding may be used, accordingly. Specifically, if in step 820 the determination made in step 815 is that at least one of the links is above the threshold, then in step 825 a select one of the at least one of the one or more links with quality above the threshold may be utilized for communication (unicast communication) with the particular node. Conversely, if the links (e.g., all) are below the threshold in step 820, then in step 830 multi-path forwarding may be utilized over a plurality of links of the particular node for communication with the particular node. The procedure 800 ends in step 835. Note that the procedure 800 is generic to both communication toward the particular node and away from the particular node, and specific illustrative details of each type of communication are described below.

Figure 9:
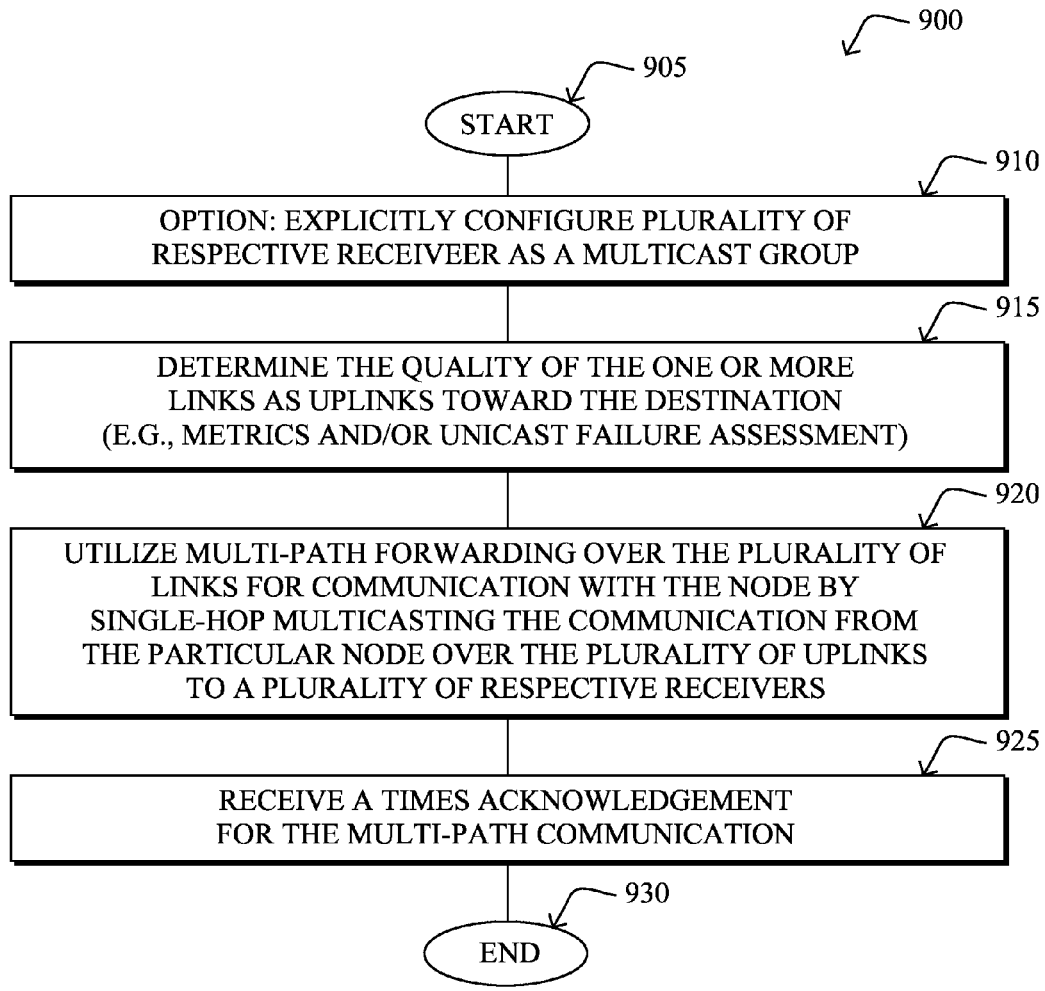
FIG. 9 illustrates another example simplified procedure for dynamic multi-path forwarding in a shared-media communication network, particularly where the communication with the particular node is from the particular node to a particular destination.

In particular, FIG. 9 illustrates another example simplified procedure for dynamic multi-path forwarding in a shared-media communication network in accordance with one or more embodiments described herein, particularly where the communication with the particular node is from the particular node to a particular destination. The procedure 900 starts at step 905, and continues to step 910, where, as described in greater detail above, in one optional embodiment, a plurality of respective receivers may be explicitly configured as a multicast group. In step 915, the quality of the one or more links as uplinks toward the destination may be determined, such as based on local link metrics and/or based on a unicast failure assessment (e.g., failure to reach the intended destination through one or more unicast transmissions over the local links). Procedure 900 only illustrates the situation where the quality of the links is below the threshold, and as such in step 920, multi-path forwarding may be utilized over the plurality of links for communication with the node by single-hop multicasting the communication from the particular node over the plurality of uplinks to a plurality of respective receivers toward the destination. Note that if an acknowledgment is to be received for the multi-path communication, in one embodiment that acknowledgment may be received in step 925 by a single receiver node based on a corresponding time period for that receiver node, as described above. The procedure 900 ends in step 930.

Figure 10:
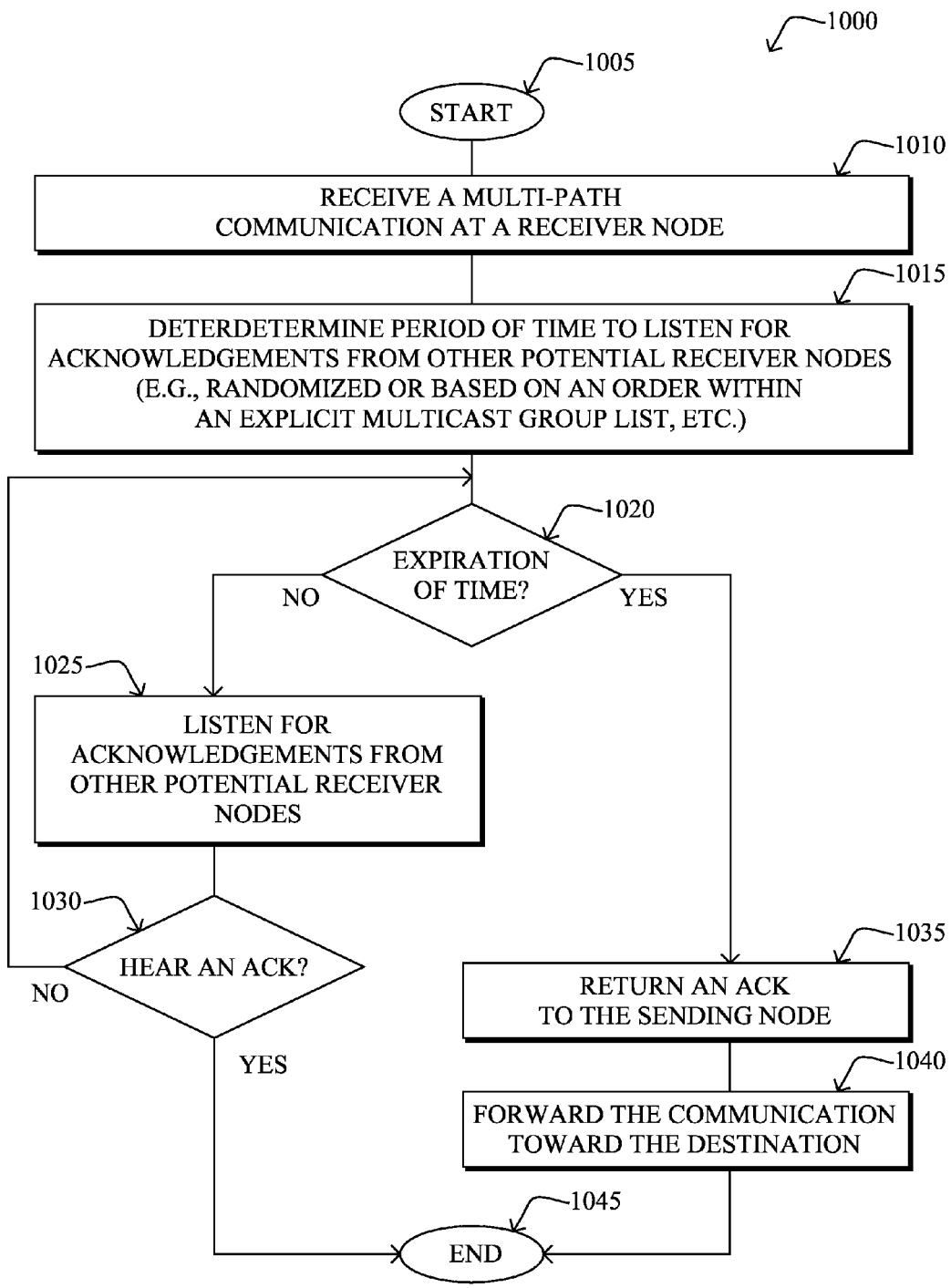
FIG. 10 illustrates another example simplified procedure for dynamic multi-path forwarding in a shared-media communication network, e.g., from the perspective of a receiver node of a multi-path communication.

Notably, FIG. 10 illustrates another example simplified procedure for dynamic multi-path forwarding in a shared-media communication network in accordance with one or more embodiments described herein, e.g., from the perspective of a receiver node of a multi-path communication. The procedure 1000 starts at step 1005, and continues to step 1010, where, as described in greater detail above, a receiver node receives a multi-path communication, and may determine a period of time to listen for acknowledgments from other potential receiver nodes in step 1015. For example, as noted above, the timing may be randomized or else based on an order within an explicit multicast group list, etc. Until expiration of the time in step 1020, the receiver node listens for acknowledgments from other potential receiver nodes in step 1025. If an acknowledgment (ACK) is heard in step 1030, then the procedure ends in step 1045. Otherwise, the receiver node continues to listen for the ACK until expiration of the time in step 1020.

In response to the time expiring in step 1020 without having heard an ACK from another node in step 1030, then in step 1035 the receiver node returns its own ACK to the sending node, and forwards the communication toward the destination in step 1040. Note that as described above, the communication may be forwarded as a unicast communication, or else the receiver node itself may utilize the dynamic multi-path forwarding techniques described herein in the event that its own local links are poor quality. The procedure ends in step 1045.

Figure 11:
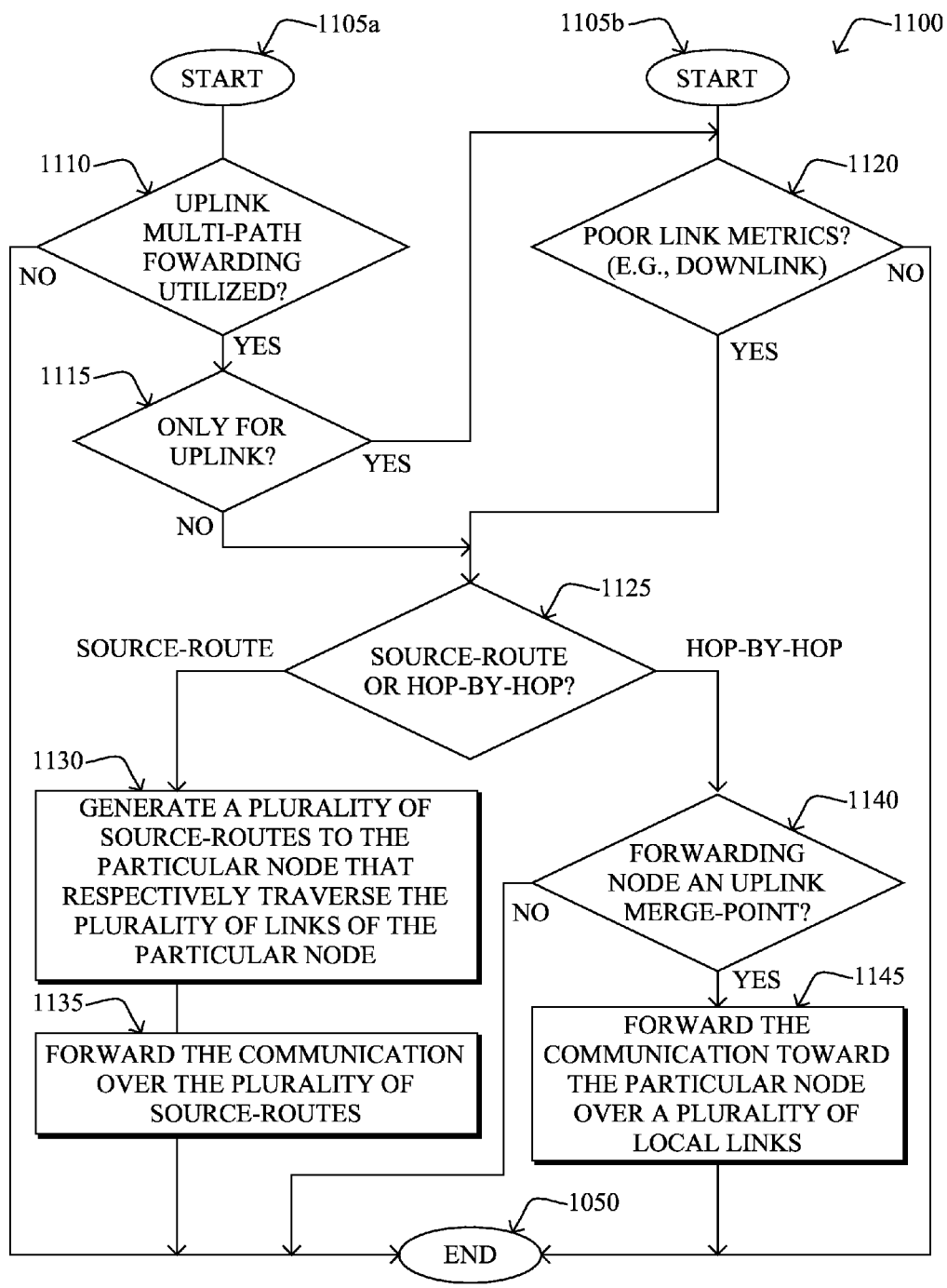
FIG. 11 illustrates another example simplified procedure for dynamic multi-path forwarding in a shared-media communication network, particularly where the communication with the particular node is from a particular source to the particular node.

Lastly, FIG. 11 illustrates another example simplified procedure for dynamic multi-path forwarding in a shared-media communication network in accordance with one or more embodiments described herein, particularly where the communication with the particular node is from a particular source to the particular node. The procedure 1100 starts in one embodiment at step 1105a, and continues to step 1110, where, as described in greater detail above, in one optional embodiment a deciding node (e.g., the root node) may determine whether uplink multi-path forwarding was utilized. If in step 1115 there was an indication that multi-path forwarding was only utilized for uplink communication (as in, the metrics were only poor for uplinks and/or no direct relation between uplink and downlink multi-path utilization is to otherwise be made), or else as an independent starting point from step 1105b, then in step 1120 a determination may also/alternatively be made to the quality of the link metrics for the particular node (e.g., downlink metrics).

In response to multi-path forwarding being used (non-exclusively) in step 1110, and/or in response to poor link metrics in step 1120, then multi-path forwarding may be used toward the particular node in accordance with either source-routing techniques or hop-by-hop techniques at step 1125. If source-routing is used, then in step 1130 the forwarding node may generate a plurality of source-routes to the particular node that respectively traverse the plurality of links of the particular node, and forwards the communication over the plurality of source-routes in step 1135. On the other hand, if hop-by-hop routing is used in step 1125, then in step 1140 the forwarding node determines whether it was an uplink merge-point for multi-path communication (or otherwise that it is a branch point for downlink multi-path communication). If so, then in step 1145 the forwarding node (merge-point) forwards the communication toward the particular node over a plurality of local links, thus eventually utilizing the plurality of (weak) links of the particular node based on respective paths to those links.

The procedure 1100 ends in step 1150, notably having either source-routed the communication (step 1135), branched the traffic over diverse local links (step 1145), or else in response to not using the multi-path mode (steps 1110 and/or 1120) to unicast the communication, accordingly.

It should be noted that while certain steps within procedures 800-1100 may be optional as described above, the steps shown in FIGS. 8-11 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures 800-1100 are described separately, certain steps from each procedure may be incorporated into each other procedure, and the procedures are not meant to be mutually exclusive.

The novel techniques described herein, therefore, provide for dynamic multi-path forwarding in a shared-media communication network. In particular, the techniques herein dynamically determine when and where (both critically important) to initiate multi-path forwarding in the network. For instance, a system in accordance with techniques herein introduce a type of communication (message/packet) that traverses some of the hops as a multicast communication and other hops as a unicast communication, and adaptively determines which links should be traversed using multicast and which links should be traversed using unicast. In addition, the techniques herein may dynamically change the mode used to propagate a packet over a specific hop based on the variable instantaneous link quality. Moreover, the techniques greatly reduce the channel usage and increase the chance to successfully transmit a packet thus decreasing the delay, which is considered an important factor and one of the greatest challenges in LLNs.

While there have been shown and described illustrative embodiments that provide for dynamic multi-path forwarding in a shared-media communication network, it is to be understood that various other adaptations and modifications may be made within the spirit and scope of the embodiments herein. For example, the embodiments have been shown and described herein with relation to wireless mesh networks, and generally to LLNs. However, the embodiments in their broader sense are not as limited, and may, in fact, be used with other types of shared-media networks and/or protocols (e.g., PLC) and in non-constrained networks. In addition, while certain protocols are shown, such as RPL, other suitable protocols may be used, accordingly. Furthermore, while the techniques have been shown for shared-media communication networks, certain aspects of the embodiments above may be utilized in wired communication networks, where listening to other communications is not necessary.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
   determining a quality of one or more links of a particular node in a communication network wherein the communication with the particular node is from the particular node to a particular destination;
   determining the quality of the one or more links as uplinks toward the destination;
   determining whether the quality of the one or more links is below a threshold;
   in response to determining that the quality of at least one of the one or more links is above the threshold, utilizing a select one of the at least one of the one or more links with quality above the threshold for communication with the particular node; and
   in response to determining that the quality of each of the one or more links is below the threshold, utilizing multi-path forwarding over the plurality of links for communication with the node by single-hop multicasting the communication from the particular node over the plurality of uplinks to a plurality of respective receivers.

2. The method as in claim 1, further comprising:
   explicitly configuring the plurality of respective receivers as a multicast group prior to single-hop multicasting the communication over the plurality of links to the plurality of respective receivers, the communication indicating the multicast group and the particular destination.

3. The method as in claim 1, further comprising:
   implicitly creating a multicast group as the plurality of respective receivers based on the single-hop multicast communication.

4. The method as in claim 3, wherein the implicitly created multicast group is selected from a group consisting of: all nodes sufficiently receiving the single-hop multicast communication; and a subset of all nodes sufficiently receiving the single-hop multicast communication based on one or more filters.

5. The method as in claim 1, wherein determining whether the quality of the plurality of links is below the threshold comprises at least one of either:
   i) determining the quality of the plurality of links based on respective link metrics in comparison to the threshold; and
   ii) determining that a set of previous unicast communication attempts over one or more of the plurality of links have all failed.

6. The method as in claim 1, further comprising
   indicating within the communication that the communication utilized multi-path forwarding, wherein intermediate nodes receiving the communication are configured to prevent duplicates of the communication in response to the communication utilizing multi-path forwarding.

7. The method as in claim 1, further comprising:
   receiving an acknowledgment for the multi-path communication from a particular receiver in response to that particular receiver having not heard another acknowledgment within a given time period.

8. The method as in claim 7, wherein the time period is selected from a group consisting of a randomized time and a time based on an order of the particular receiver within an explicit multicast group list.

9. An apparatus, comprising:
one or more network interfaces to communicate as one or more local links within a communication network;
a processor coupled to the network interfaces and adapted to execute one or more processes; and
a memory configured to store process executable by the processor, the process when executed operable to:
determine a quality of one or more links of a particular node in the communication network wherein the communication with the particular node is from the particular node to a particular destination;
determine the quality of the one or more links as uplinks toward the destination;
determine whether the quality of the one or more links is below a threshold;
in response to determining that the quality of at least one of the one or more links is above the threshold, utilize a select one of the at least one of the one or more links with quality above the threshold for communication with the particular node; and
in response to determining that the quality of each of the one or more links is below the threshold, utilize multi-path forwarding over the plurality of links for communication with the node by single-hop multicasting the communication from the particular node over the plurality of uplinks to a plurality of respective receivers.

10. The apparatus as in claim 9, the process further configured to:
explicitly configure the plurality of respective receivers as a multicast group prior to single-hop multicasting the communication over the plurality of links to the plurality of respective receivers, the communication indicating the multicast group and the particular destination.

11. The apparatus as in claim 10, the process further configured to:
implicitly create a multicast group as the plurality of respective receivers based on the single-hop multicast communication.

12. The apparatus as in claim 11, wherein the implicitly created multicast group is selected from a group consisting of: all nodes sufficiently receiving the single-hop multicast communication; and a subset of all nodes sufficiently receiving the single-hop multicast communication based on one or more filters.

13. The apparatus as in claim 10, wherein the determination whether the quality of the plurality of links is below the threshold comprises at least one of either:

i) determine the quality of the plurality of links based on respective link metrics in comparison to the threshold; and
ii) determine that a set of previous unicast communication attempts over one or more of the plurality of links have all failed.

14. The apparatus as in claim 10, the process further configured to:
indicate within the communication that the communication utilized multi-path forwarding, wherein intermediate nodes receiving the communication are configured to prevent duplicates of the communication in response to the communication utilizing multi-path forwarding.

15. The apparatus as in claim 10, the process further configured to:
receive an acknowledgment for the multi-path communication from a particular receiver in response to that particular receiver having not heard another acknowledgment within a given time period.

16. The apparatus as in claim 15, wherein the time period is selected from a group consisting of a randomized time and a time based on an order of the particular receiver within an explicit multicast group list.

17. A tangible, non-transitory, computer-readable media having software encoded thereon, the software when executed by a processor operable to:
determine a quality of one or more links of a particular node in a communication network;
determine whether the quality of the one or more links is below a threshold;
determine the quality of the one or more links as uplinks toward the destination;
in response to determining that the quality of at least one of the one or more links is above the threshold, utilize a select one of the at least one of the one or more links with quality above the threshold for communication with the particular node; and
in response to determining that the quality of each of the one or more links is below the threshold, utilize multi-path forwarding over the plurality of links for communication with the node by single-hop multicasting the communication from the particular node over the plurality of uplinks to a plurality of respective receivers.

18. The computer-readable media as in claim 17, wherein the communication with the particular node is one of either from the particular node to a particular destination or from a particular source to the particular node.

* * * * *

UNITED STATES PATENT AND TRADEMARK OFFICE
CERTIFICATE OF CORRECTION

| | | |
|---|---|---|
| PATENT NO. | : 8,630,291 B2 | Page 1 of 1 |
| APPLICATION NO. | : 13/214844 | |
| DATED | : January 14, 2014 | |
| INVENTOR(S) | : Shmuel Shaffer et al. | |

It is certified that error appears in the above-identified patent and that said Letters Patent is hereby corrected as shown below:

In the Specification

Column 3, line 3, please amend as shown:

networks. That is, in addition to one or more sensors, each

Column 6, line 12, please amend as shown:

not intersect along the way. Without selective techniques as

Signed and Sealed this
Eighth Day of July, 2014

Michelle K. Lee
*Deputy Director of the United States Patent and Trademark Office*